United States Patent
Sato et al.

(10) Patent No.: US 10,169,303 B2
(45) Date of Patent: Jan. 1, 2019

(54) MANAGEMENT SYSTEM FOR MANAGING INFORMATION SYSTEM

(71) Applicant: HITACHI, LTD., Tokyo (JP)

(72) Inventors: Yosuke Sato, Tokyo (JP); Kousuke Shibata, Tokyo (JP); Kazuki Ootsubo, Tokyo (JP); Takaichi Ishida, Tokyo (JP); Tsutomu Fujii, Kanagawa (JP); Tomoki Kimura, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 126 days.

(21) Appl. No.: 15/124,688

(22) PCT Filed: May 27, 2014

(86) PCT No.: PCT/JP2014/064014
§ 371 (c)(1),
(2) Date: Sep. 9, 2016

(87) PCT Pub. No.: WO2015/181897
PCT Pub. Date: Dec. 3, 2015

(65) Prior Publication Data
US 2017/0017617 A1    Jan. 19, 2017

(51) Int. Cl.
*G06F 17/24* (2006.01)
*G06F 17/21* (2006.01)
(Continued)

(52) U.S. Cl.
CPC ............ *G06F 17/212* (2013.01); *G06F 3/048* (2013.01); *G06F 9/4443* (2013.01); *G06F 9/451* (2018.02);
(Continued)

(58) Field of Classification Search
CPC ...... G06F 17/245; G06F 17/246; G06F 17/24; G06F 17/212; G06F 17/30; G06F 9/451;
(Continued)

(56) References Cited

U.S. PATENT DOCUMENTS 5,778,370 A * 7/1998 Emerson ........... G06F 17/30289
5,933,833 A * 8/1999 Musashi ............... G06F 17/245
(Continued)

FOREIGN PATENT DOCUMENTS

WO    2009/122626 A1    10/2009

OTHER PUBLICATIONS

International Search Report of PCT/JP2014/064014 dated Jul. 1, 2014.

*Primary Examiner* — Scott T Baderman
*Assistant Examiner* — Hassan Mrabi
(74) *Attorney, Agent, or Firm* — Mattingly & Malur, PC

(57) ABSTRACT

A management system displays a plurality of elements detected from an information system according to a horizontal relation view (HRV) format which is a multi-column display format, based on information of the plurality of detected elements. In the HRV format display, the plurality of columns correspond to a plurality of types, and include a key column which is a column serving as a key for aggregated display and an aggregation target column subjected to aggregated display according to the key column. The key column includes key objects which represent information on elements belonging to the corresponding type and which are arranged vertically. A lateral area of each of the key objects in the aggregation target column includes aggregation objects indicating aggregation information of elements related to an element represented by the key object, whereby the key objects and the related aggregation objects are arranged on the same row.

20 Claims, 28 Drawing Sheets

(51) Int. Cl.
  *G06F 9/451*   (2018.01)
  *G06F 13/00*   (2006.01)
  *G06F 17/30*   (2006.01)
  *G06F 3/048*   (2013.01)
  *G06F 9/44*    (2018.01)
  *G06Q 10/00*   (2012.01)

(52) U.S. Cl.
  CPC ............ *G06F 13/00* (2013.01); *G06F 17/245* (2013.01); *G06F 17/30* (2013.01); *G06Q 10/00* (2013.01)

(58) Field of Classification Search
  CPC ........ G06F 9/4443; G06F 13/00; G06F 3/048; G06Q 10/00
  USPC ...................................................... 715/227
  See application file for complete search history.

(56) References Cited

U.S. PATENT DOCUMENTS

| | | | | |
|---|---|---|---|---|
| 8,255,791 | B2* | 8/2012 | Koren | G06Q 10/10 715/227 |
| 9,329,924 | B2* | 5/2016 | Mikami | G06F 11/079 |
| 9,700,158 | B1* | 7/2017 | Reed | A47F 5/106 |
| 9,787,588 | B2* | 10/2017 | Jiang | H04L 45/74 |
| 2002/0091728 | A1* | 7/2002 | Kjaer | G06F 17/246 715/212 |
| 2003/0167278 | A1* | 9/2003 | Baudel | G06F 17/30716 |
| 2005/0138160 | A1* | 6/2005 | Klein | H04L 41/024 709/223 |
| 2006/0015805 | A1* | 1/2006 | Humenansky | G06F 17/246 715/209 |
| 2006/0020524 | A1* | 1/2006 | Yeko, Sr. | G06Q 30/0613 705/26.62 |
| 2006/0107196 | A1* | 5/2006 | Thanu | G06F 17/246 715/217 |
| 2007/0078881 | A1* | 4/2007 | Vignet | G06F 17/245 |
| 2009/0113284 | A1* | 4/2009 | Kulkarni | G06F 17/246 715/219 |
| 2009/0249213 | A1* | 10/2009 | Murase | G06F 9/4443 715/735 |
| 2010/0070914 | A1* | 3/2010 | Craig | G06F 3/1462 715/798 |
| 2010/0083173 | A1* | 4/2010 | Germann | G06F 17/30997 715/810 |
| 2011/0004914 | A1* | 1/2011 | Ennis, Jr. | H04L 41/0853 726/1 |
| 2011/0066933 | A1* | 3/2011 | Ludwig | G06F 17/211 715/212 |
| 2012/0310423 | A1* | 12/2012 | Taft | G06Q 50/06 700/286 |
| 2012/0310558 | A1* | 12/2012 | Taft | H02J 3/00 702/61 |
| 2012/0310559 | A1* | 12/2012 | Taft | H02J 13/0013 702/62 |
| 2013/0205192 | A1* | 8/2013 | Spada | G06F 17/2264 715/227 |
| 2013/0227589 | A1* | 8/2013 | Mikami | G06F 11/327 719/318 |
| 2014/0177634 | A1* | 6/2014 | Jiang | H04L 45/64 370/392 |
| 2014/0244625 | A1* | 8/2014 | Seghezzi | G06F 19/28 707/722 |
| 2015/0025903 | A1* | 1/2015 | Mueller-Wolf | G06F 19/322 705/2 |
| 2015/0089424 | A1* | 3/2015 | Duffield | G06Q 10/00 715/771 |
| 2015/0278219 | A1* | 10/2015 | Phipps | G06Q 10/0637 707/711 |
| 2017/0230946 | A1* | 8/2017 | Kim | H04W 72/042 |
| 2017/0262425 | A1* | 9/2017 | Ludwig | G06F 17/211 |

\* cited by examiner

FIG. 17A

| Element ID | Element name | Element type |
|---|---|---|
| 1 | VM#01 | VM |
| 2 | VSP#01 | Storages |
| .... | .... | .... |

| Element ID | Related element ID |
|---|---|
| 4 | 1 |
| .... | .... |
| 6 | 7 |
| .... | .... |

| Element type | Child element type |
|---|---|
| Tag | Client |
| Storage | LDEV |
| .... | .... |

| Element ID | Element type | Occurrence time | Error message ID |
|---|---|---|---|
| 1 | CPU | 2014/02/11 09:00:11 | 100 |
| 3 | Memory | 2014/02/21 04:52:21 | 201 |
| .... | .... | .... | .... |

| Tags | LAN | Server Clusters | SAN | Storages |
|---|---|---|---|---|
| 12 Clients | 2 Subnets | 5 Server Clusters | 1 Zones | VSP#01 |
| 18 Clients | 1 Subnets | 8 Server Clusters | 2 Zones | VSP#02 |
| 15 Clients | 1 Subnets | 7 Server Clusters | 1 Zones | VSP#03 |
| 7 Clients | 2 Subnets | 4 Server Clusters | 2 Zones | VSP#04 |

FIG. 30

| Tags | LAN | Server Clusters | SAN | Storages |
|---|---|---|---|---|
| 12 Clients | 2 Subnets | 5 Server Clusters | 1 Zones | VSP#01 |
| 18 Clients | 1 Subnets | 8 Server Clusters | 2 Zones | VSP#02 |
| 15 Clients | 1 Subnets | 7 Server Clusters | 1 Zones | VSP#03 |
| 7 Clients | 2 Subnets | 4 Server Clusters | 2 Zones | VSP#04 |

FIG. 31

| Tags | LAN | Server Clusters | SAN | Storages |
|---|---|---|---|---|
| 12 Clients | 2 Subnets | 5 Server Clusters | 1 Zones | VSP#01 |
| 18 Clients | 1 Subnets | 8 Server Clusters | 2 Zones | VSP#02 |
| 15 Clients | 1 Subnets | 7 Server Clusters | 1 Zones | VSP#03 |
| 7 Clients | 2 Subnets | 4 Server Clusters | 2 Zones | VSP#04 |

FIG. 32

| Tags | LAN | Server Clusters | SAN | Storages |
|---|---|---|---|---|
| 12 Clients | 2 Subnets | 5 Server Clusters | 1 Zones | VSP#01 |
| 18 Clients | 1 Subnets | 8 Server Clusters | 2 Zones | VSP#02 |
| 15 Clients | 1 Subnets | 7 Server Clusters | 1 Zones | VSP#03 |
| 7 Clients | 2 Subnets | 4 Server Clusters | 2 Zones | VSP#04 |

MANAGEMENT SYSTEM FOR MANAGING INFORMATION SYSTEM

TECHNICAL FIELD

The present invention generally relates to management of an information system including a plurality of elements of a plurality of types.

BACKGROUND ART

In general, information on a plurality of elements included in an information system is displayed in management of an information system, and the information system is managed by an administrator based on the displayed information. PTL 1 is known as an example of this type of technique. According to PTL 1, elements of an information system are displayed in multiple columns and an end-to-end relation between the elements is drawn as lines.

CITATION LIST

Patent Literature

[PTL 1]
WO2009/122626

SUMMARY OF INVENTION

Technical Problem

According to the technique of PTL 1, when the number of management target elements increases, the number of displayed elements increases, and the number of drawn lines also increases. Thus, visibility worsens and it is difficult to understand the structure.

Solution to Problem

A management system displays a plurality of elements detected from an information system according to a horizontal relation view (HRV) format which is a multi-column display format based on information on the plurality of detected elements. In the HRV format display, each of the plurality of columns corresponds to any one of a plurality of types, and the plurality of columns includes a key column which is a column serving as a key for aggregated display and an aggregation target column subjected to aggregated display according to the key column. The key column includes key objects which represent information on elements belonging to the corresponding type and which are arranged vertically. A lateral area of each of the key objects in the aggregation target column includes aggregation objects indicating aggregation information of elements related to an element represented by the key object, whereby the key objects and the related aggregation objects are arranged on the same row.

Advantageous Effects of Invention

Even when the number of elements increases, the visibility does not worsen.

BRIEF DESCRIPTION OF DRAWINGS

FIG. 17A illustrates an example of an element list table.

FIG. 17B illustrates an example of an element relation table.

FIG. 18 illustrates an example of an element type relation table.

FIG. 19 illustrates an example of an element error table.

FIG. 29 illustrates a first variation in which a relation with a key element is depicted in a horizontal direction.

FIG. 30 illustrates a comparative example in which a relation with a key element is depicted in a horizontal direction.

FIG. 31 illustrates a second variation in which a relation with a key element is depicted in a horizontal direction.

FIG. 32 illustrates a third variation in which a relation with a key element is depicted in a horizontal direction.

DESCRIPTION OF EMBODIMENTS

Figure 1:
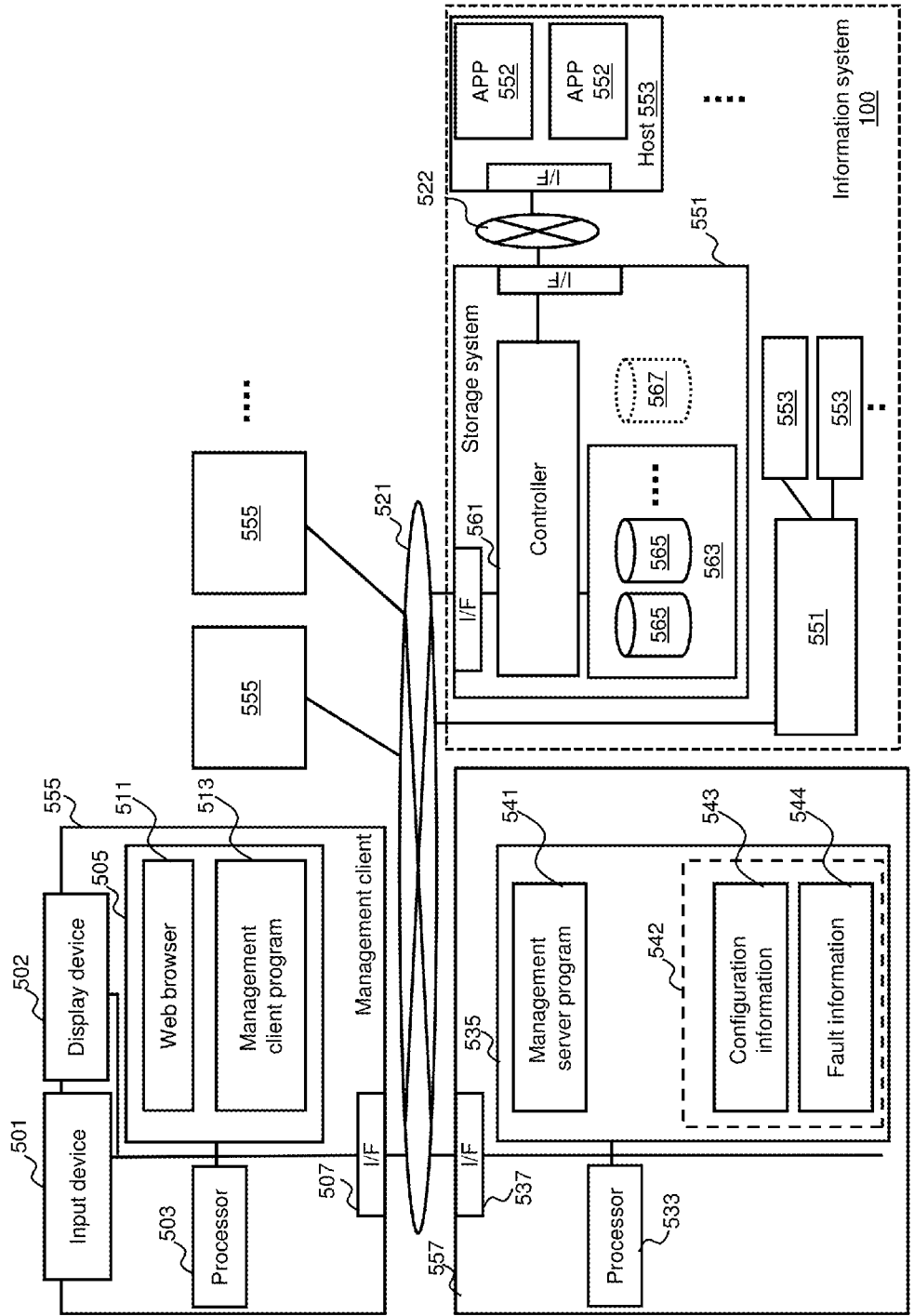
FIG. 1 illustrates a configuration of an information system and a management system according to an embodiment.

Hereinafter, an embodiment will be described.

In the following description, although expressions such as "abc table" are used to describe information, the information may be expressed in a data configuration other than a table. In order to show that the information does not depend on a data configuration, at least one of the items in the "abc table" may be called "abc information".

In the following description, there may be cases where a process is described using a "program" as the subject. However, since a predetermined process is performed using a storage resource (for example, a memory) and/or a communication interface device (for example, a communication port) as necessary when a program is executed by a physical CPU, the physical CPU may also be used as the subject of the process. Conversely, it can be understood that a process described using a physical CPU as the subject is performed by executing one or more programs. Moreover, the physical CPU may include a hardware circuit that performs a portion or all of the processes performed by a processor and may mean each core of a multi-core processor. A computer program may be installed in each computer from a program source. The program source may be a program distribution server or a storage medium, for example. The program distribution server includes a storage device (that stores a distribution target computer program and a distribution program that distributes the computer program to a computer) and a CPU (that executes the distribution program).

Further, in the following description, although names or IDs are used as identification information of elements, the names or IDs may be mutually replaceable and another type of identification information may be used instead of or in addition to at least one of the names or IDs. In the following description, an "element" means a constituent element of an information system, and specifically, is a generic name of each of a plurality of nodes (apparatuses) that form the information system and each of a plurality of components included in each node. Examples of a node include a physical node (for example, a network switch) and a logical node (for example, a virtual machine). Similarly, examples of a component include a physical component (for example, a microprocessor) and a logical component (for example, LDEV (logical volume)).

Moreover, a management system may include one or more computers. Specifically, for example, when a management computer displays information (specifically, when a management computer displays information on a display device thereof or a management computer transmits display information to a remote display computer), the management computer is the management system. Moreover, for example, when the functions identical or similar to those of the management computer are realized by a plurality of computers, the plurality of computers (which may include a display computer when the display computer displays information) is the management system. In the present embodiment, a management server 557 is a management computer, and a management client 555 is a display computer.

Further, in the following description, an operation that a user (for example, an administrator) performs on a graphical user interface (GUI) as a management screen of an information system using an input device is referred to as a "user operation". The input device used for the user operation is generally a pointing device or a touch screen.

First, an overview of the present embodiment will be described.

In recent years, an information system undergoes an increase in size and complexity due to, for example, at least one of the following factors:

A process handled by an information system increases in volume;

A large number of processes are executed by an information system as in a cloud service;

The number of types of nodes in an information system has increased;

An internal structure of a node has become complex, the number of types of components (for example, logical components and physical components) that form a node increases, and there arises a need to manage these components;

A virtualization technique (for example, server virtualization, network virtualization, storage virtualization, and data center virtualization) has been adopted widely, which has enabled division and collection of apparatuses; and Deployment and migration techniques are advancing.

Here, "increase in size" means that the number of elements, such as nodes that form an information system and components of the node, which are management targets in the information system has increased.

In addition, "increase in complexity" means at least one of the followings: due to the increase in the number of types of management target elements, elements have a relation of M:1, 1:N, and M:N (where M and N are integers of 2 or more); the value of at least one of M and N increases; and a relation between the elements changes every moment.

On the other hand, in a general topology display technique, all display objects of a display target element are displayed, and a line is displayed between the display objects to represent a relation between the elements. However, when the general topology display technique is applied to an information system that undergoes an increase in size and complexity, a user cannot efficiently and quickly detect a faulty element and understand the state of related elements for the analysis. This results from at least one of the following reasons.

(A) When the information system increases in size, the number of display objects to be displayed increases too much and the efficiency decreases. For example, when the display objects of all elements are to be displayed in one screen, the size of the display object of an individual element becomes small. On the other hand, when the size of the individual display object is maintained to be the same, the display objects of all elements do not fit into one screen, and a user has to understand the relation between the elements while scrolling the screen, which however is troublesome.

(B) When the number of element types increases, there is a limit on distinguishing the element types by at least one of the shape and the color of the display object. As a practical problem, when the size of the display object is too large, the number of display objects that can be displayed in one screen decreases. However, when a large number of element types are represented by icons having a small size, the user cannot distinguish the shapes of icons unless the user looks at the icons more carefully. Thus, the efficiency decreases.

(C) When the information system undergoes an increase in size and complexity, a number of display objects and a number of lines indicating the relation between the display objects are drawn. Thus, it is not possible to understand the relation between the elements.

(D) It is assumed that the management system can arrange display objects on a screen so that relation lines do not overlap as much as possible so that the topology is easily visible by taking the relation of elements into consideration. However, when the relation between elements changes time-sequentially, due to this function (a function of adjusting the arrangement positions of display objects), the arrangement of the display objects on the screen changes before and after the relation between the elements changes. As a result, the user cannot efficiently find a desired display object from the screen.

Thus, in the present embodiment, a novel display format is realized. In the present embodiment, this display format is referred to as a "topology table view format". The "topology table view format" comes in the two formats of horizontal relation view (HRV) and vertical element list view (VEL) which have different roles.

In the HRV format, a specific element type is selected and aggregation information (for example, the number) of other elements related to elements belonging to the element type is represented by the lines (rows) of display objects (cells or boxes of the table) based on the element type.

In the VEL format, a list of elements is displayed for each of the specific element types.

According to the HRV format, a user can see related elements by turning the eyes horizontally from a target element. Thus, by switching the display format to the VEL format, the user can see a list of related elements.

Moreover, in the HRV format as well as the VEL format, it is possible to eliminate lines representing the relation and to secure a drawing space of a larger number of elements. Due to this, the number of display objects that can be displayed in one screen increases and the overall visibility of the system is improved.

Hereinafter, the present embodiment will be described in detail. A vertical direction (Vertical) and a horizontal direction (Horizontal) exemplified in the following description are examples and the directions may be applied in any way as long as different two axes are used. For example, the two directions maybe expressed by a horizontal direction and a depth direction and the vertical direction and the horizontal direction may be replaced with each other.

FIG. 1 illustrates a configuration of an information system and a management system according to an embodiment.

An information system 100 may be also referred to as a computer system and includes one or more hosts 553 and one or more storage systems 551 coupled to the one or more hosts 553. The storage system 551 is coupled to the host 553 via a communication network 521 (for example, a storage area network (SAN) or a local area network (LAN)), for example.

The storage system 551 has a physical storage device group 563 and a controller 561 coupled to the physical storage device group 563.

The physical storage device group 563 has one or more parity groups (PGs). The PG is sometimes referred to as a redundant array of independent (or inexpensive) disks (RAID) group. The PG includes a plurality of physical storage devices and stores data according to a predetermined RAID level. The physical storage device is a hard disk drive (HDD) or a solid state drive (SSD), for example.

The storage system 551 has a plurality of logical volumes. Examples of the logical volume include a substantial logical volume (real volume) 565 based on the PG and a virtual logical volume (virtual volume) 567 that complies with a thin provisioning technique or a storage virtualization technique. One storage system 551 may not necessarily have a plurality of types of logical volumes. For example, the storage system 551 may have only the real volume 565 as the logical volume. A storage area is allocated from a pool to the virtual volume that complies with the thin provisioning technique. The pool is a storage area group based on one or more physical storage devices (for example, PGs) and may be a set of one or more logical volumes, for example. The pool may be a pool in which a difference between an original logical volume and a snap-shot thereof is stored, instead of a pool having a storage area allocated to the virtual volume that complies with the thin provisioning technique.

The controller 561 includes a plurality of devices (for example, a port, an MPB (a blade (circuit board) having one or more microprocessors (MPs)), and a cache memory). For example, the port receives an input/output (I/O) command (a write command or a read command) from the host 553, and the MP provided in the MPB controls I/O of the data according to the I/O command. Specifically, for example, the MP specifies the logical volume corresponding to an I/O destination from the received I/O command and performs I/O of data with respect to the specified logical volume. The data that undergoes I/O with respect to the logical volume is temporarily stored in the cache memory.

The host 553 may be either a physical computer or a virtual computer. One or more application programs (APPs) 552 are executed in the host 553. When the APP 552 is executed, the I/O command that designates the logical volume is transmitted from the host 553 to the storage system 551.

As described above, the information system 100 has a plurality of hierarchical elements. Specifically, the plurality of elements include elements of two or more types selected from the APP 552, the host 553, the storage system 551, the controller 561, the port, the MPB, the cache memory, the logical volume, the PG, and the like. When the plurality of elements on the same layer are grouped, an element on an upper layer than the elements on the same layer may be defined. The "element" may include a substantial element such as an APP and a logical volume and a virtual element which is a group of a plurality of substantial elements. Moreover, a "parent element" of an element is an element which is correlated with the element and is one layer above the element. A "child element" of an element is an element which is correlated with the element and is one layer below the element. The child element can be also referred to as a "sub-element" as described later.

The management system includes the management server 557 and one or more management clients 555 coupled to the management server 557. The management server 557 is coupled to the management client 555 via a communication network (for example, a LAN, a world area network (WAN), or the Internet) 521.

The management client 555 has an input device 501, a display device 502, a storage device (for example, a memory) 505, a communication interface device (hereinafter, I/F) 507, and a processor (for example, a central processing unit (CPU)) 503 coupled to these devices. The input device 501 is a pointing device and a key board, for example. The display device 502 is a device having a physical screen for displaying information, for example. A touch screen in which the input device 501 and the display device 502 are integrated may be adopted. The I/F 507 is coupled to the communication network 521 and the management client 555 can communicate with the management server 557 via the I/F 507. The communication network 521 may share a partial portion or an entire portion thereof with a network that couples the host 553 and the storage system 551 to each other.

A storage device 505 has at least a main storage device (typically, a memory) among a main storage device and an auxiliary storage device, for example. The storage device 505 can store a computer program executed by the processor 503 and information used by the processor 503. Specifically, the storage device 505 stores a web browser 511 and a management client program 513, for example. The management client program 513 may be a rich Internet application (RIA). Specifically, the management client program is a program file and may be downloaded from the management server 557 (or another computer) and stored in the storage device 505, for example.

The management server 557 has a storage device 535, an I/F 537, and a processor (for example, a central processing unit (CPU)) 533 coupled thereto. The I/F 537 is coupled to the communication network 521, and the management server 557 can communicate with the management client 555 via the I/F 537. The management server 557 can receive an instruction corresponding to a user operation via the I/F 537 and draw a display object in a layout area. Thus, the I/F 537 is an example of an I/O interface device. The "layout area" mentioned herein is an area in which the display object can be drawn (sometimes referred to as arranged). The range of an entire portion or a partial portion of the layout area is a display range in a frame (for example, a window) displayed by the web browser 511 (or the management client program 513). A display image (including display objects) in the frame, of the layout area in which display objects are drawn can be referred to as a display screen or a GUI screen. An object that overlaps the display range among the objects drawn in the layout area is displayed on a physical screen of the display device 502. Thus, drawing an object in the layout area is substantially an example of displaying an object.

The storage device 535 has at least a main storage device (typically, a memory) among a main storage device and an auxiliary storage device, for example. The storage device 535 can store a computer program executed by the processor 533 and information used by the processor 533. Specifically, the storage device 535 stores a management server program 541 and a management table 542, for example. The management table 542 includes a table 543 that defines a hierarchical relation (configuration information) of a plurality of elements included in the information system and a table 544 that stores error information of each element. These items of information may be collected by the management server program 541 and may be acquired by accessing another management system that possesses the information. The management server program 541 receives an instruction corresponding to a user operation from the management client 555 and transmits information drawn in the layout area to the management client 555.

A GUI screen display corresponding to a user operation is realized by cooperation of the management server program 541, the web browser 511 (or an RIA execution environment of a client), and the management client program 513. Examples of the cooperation are given below. To simplify the description, a case where Cooperation Example 2 is adopted in the present embodiment will be described. However, the present invention can naturally be applied to Cooperation Example 1.

COOPERATION EXAMPLE 1

The management server program 541 transmits at least a portion of the information included in the tables 543 and 544 to the web browser 511 (or the management client program 513), and the web browser 511 (or the management client program 513) stores the same in the storage device 505 as temporary information. The web browser 511 (or the management client program 513) draws (for example, newly draws, enlarged, or reduces the display object) the display object in the layout area based on the temporary information and the instruction corresponding to the user operation.

COOPERATION EXAMPLE 2

The management server program 541 receives the instruction corresponding to the user operation on the display screen from the web browser 511 (or the management client program 513), creates display information of the display object based on the instruction and the tables 543 or 544, and transmits the display information. The web browser 511 (or the management client program 513) receives the display information and draws the display object in the layout area according to the display information. That is, in short, the management server program 541 draws the display object in the layout area. When a user operation is performed on the GUI screen, the web browser 511 (or the management client program 513) transmits the instruction corresponding to the user operation to the management server program 541.

Hereinafter, in order to simplify the description, it is assumed that display control is performed by the management server program 541 below.

Figure 2:
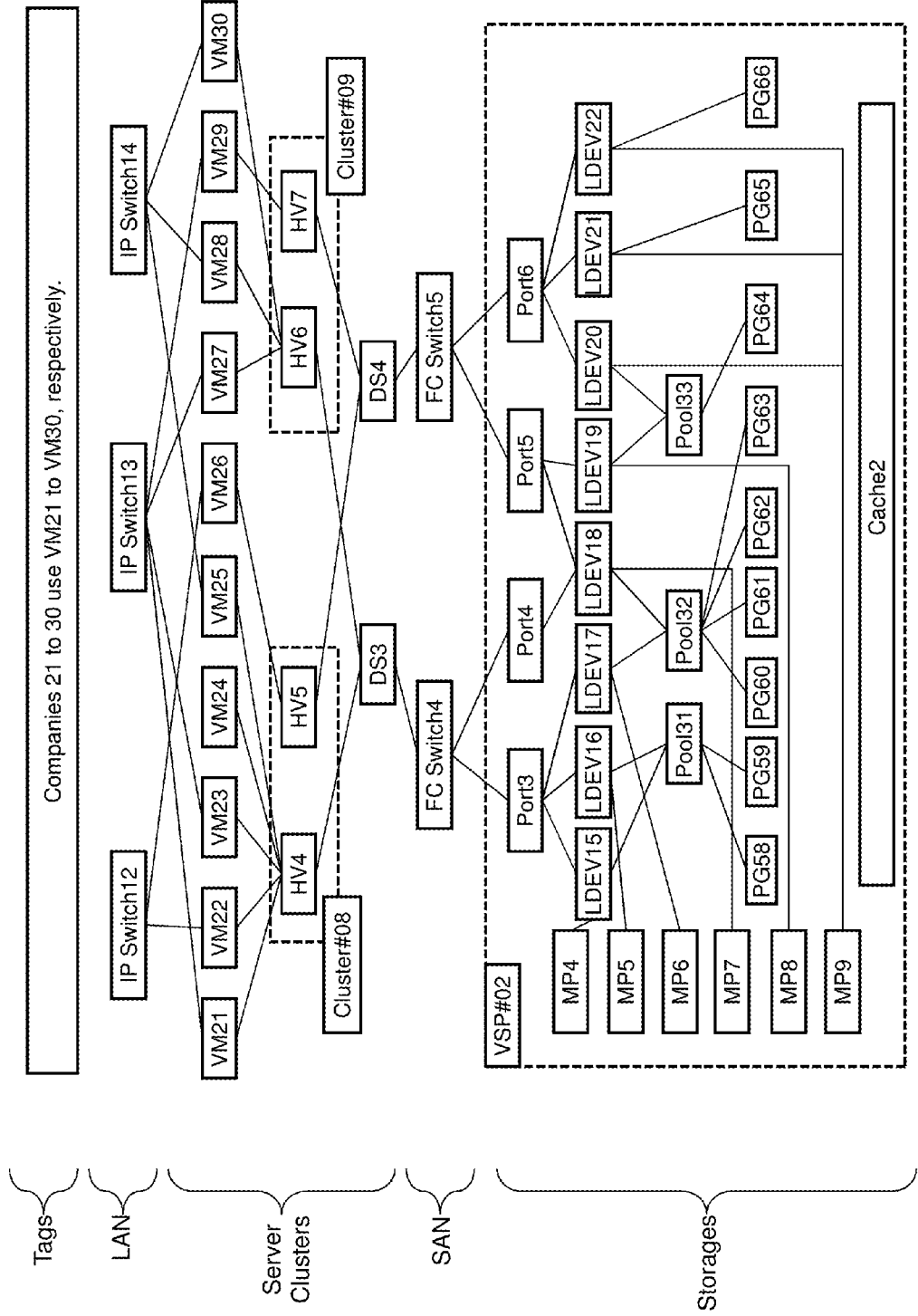
FIG. 2 illustrates an example of an element topology configuration.

FIG. 2 illustrates an example of an element topology configuration.

The information system 100 includes one or more element topology configurations. For example, according to the example of FIG. 2, Tags, LAN, Server Clusters, SAN, and Storages are arranged in that order from the top as a plurality of layers. Each layer is one of element types. An element belonging to a first layer (top layer) "Tags" is "Company" (a company which uses an element (virtual machine (VM) in the information system 100). An element belonging to a second layer "LAN" is "IP Switch" (an IP switch in the LAN). An element belonging to a third layer "Server Clusters" is a plurality of types of elements, which specifically includes "VM" (a virtual machine executed by a host), "HV" (a hypervisor which controls one or more virtual machines and is executed by the host), "Cluster" (a cluster of hypervisor), and "DS" (a data store). The "Cluster" is a parent element of "HV". "Data store" is an element recognized by the hypervisor as a storage device. An element belonging to a fourth layer "SAN" is "FC Switch" (a fibre channel (FC) switch in the SAN). An element belonging to a fifth layer "Storages" is "VSP" (a storage system). Examples of a plurality of types of components included in the storage system as a child element of "VSP" include "Port" (a communication port that is coupled to an FC switch and that receives an I/O command from a virtual machine), "LDEV" (a logical volume (a real volume or a virtual volume)), "MP" (a microprocessor), "Pool" (a storage area including a real area allocated to a virtual volume according to the thin provisioning technique), "PG" (a parity group), and "Cache" (a cache memory in which data input and output to and from a logical volume is temporarily stored).

According to the example illustrated in FIG. 2, companies "Company21" to "Company30" use virtual machines "VM21" to "VM30" that access a storage system "VSP#02". The companies "Company21" to "Company30" (for example, client computers) access virtual machines "VM22" and "VM26" via an IP switch "IP Switch12". The virtual machine "VM22" is controlled by one hypervisor "HV4" in a cluster "Cluster#08" and the virtual machine "VM26" is controlled by the other hypervisor "HV5" in the cluster "Cluster#08". Data is input and output to and from a storage device "DS3" of a hypervisor "HV4" by the virtual machine "VM22," and the data input and output to and from the storage device "DS3" is input and output to and from any of logical volumes "LDEV15" to "LDEV18" correlated with communication ports "Port3" and "Port4", via an FC switch "FC Switch4". The logical volume "LDEV15" is controlled by an MP "MP4". The logical volume "LDEV15" is a virtual volume which is correlated with the pool "Pool31" and to which a real area is allocated from a pool "Pool31", and the pool "Pool31" is a storage area based on two parity groups "PG58" and "PG59".

Such an element topology configuration as illustrated in FIG. 2 is a configuration specified from configuration information represented by the table 543. In the present embodiment, although a display corresponding to the HRV format and a display corresponding to the VEL format are performed, the display (for example, a display described with reference to FIGS. 3 to 15) is performed with respect to the management client 555 by the management server 557 (the management server program 541) based on the table 543. Hereinafter, a plurality of examples of the GUI screen displayed on the management client 555 will be described. In the following description, a statement that the display is performed by the "management server 557 (management server program 541" is sometimes omitted to simplify the description. The concepts "upper/lower" and "parent/child" may change depending on a target being managed (for example, monitored) by the user, and such concepts may be omitted. For example, when the relation is a "coupling relation" between a server and a storage system via an FC switch, whether the server or the storage system is an upper element or a parent element is not uniquely determined from the viewpoint that both are simply coupled to each other. Whether the server is an upper element, the storage system is an upper element, or the concept of upper and lower elements is not introduced is determined based on the viewpoint of the user. In contrast, when the relation is an inclusion (for example, a node includes components), a concept that a lower element (or a child element) of a node is a component may be generally accepted irrespective of the user's viewpoint.

<HRV Format>

Figure 3:
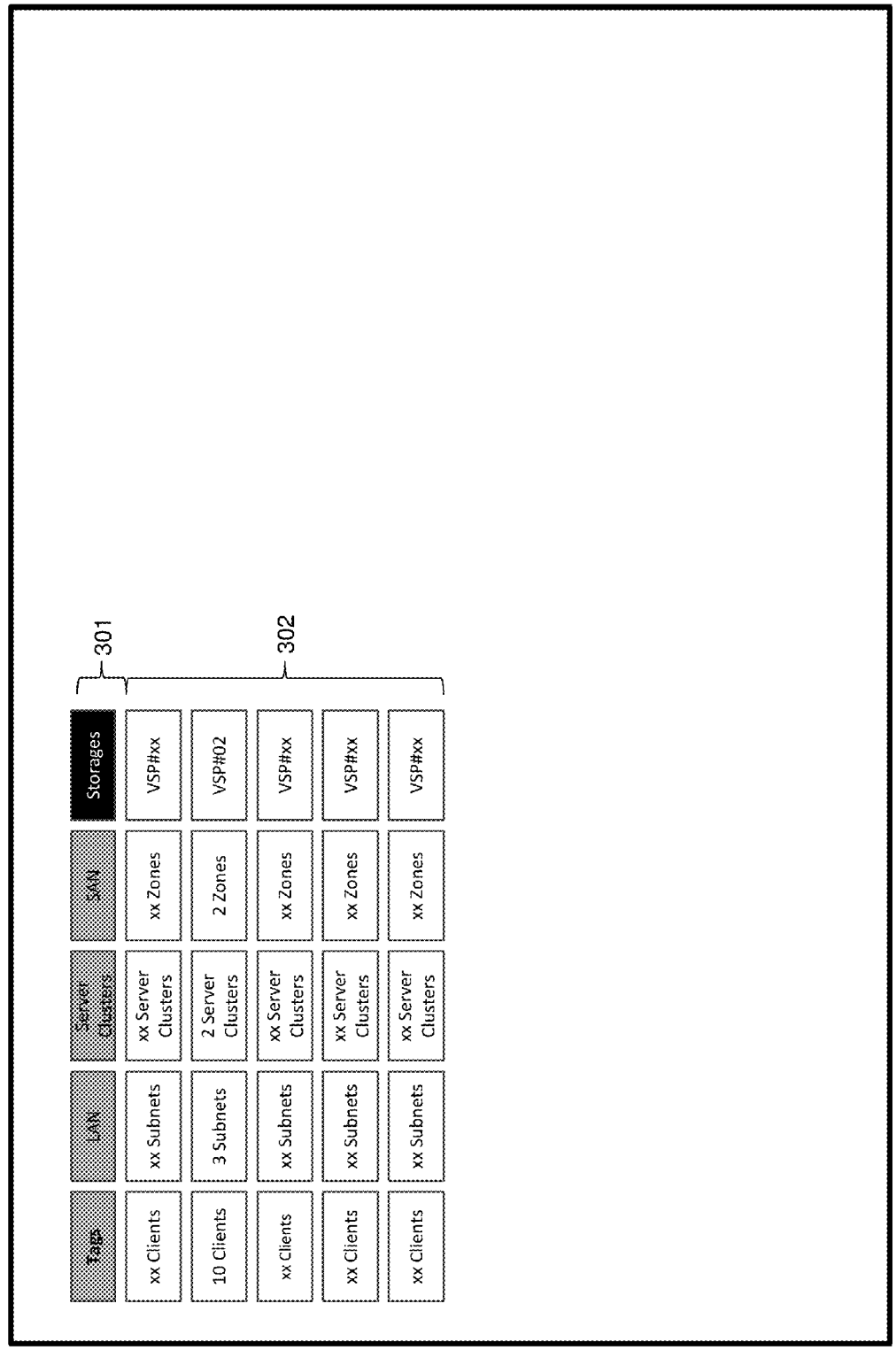
FIG. 3 illustrates an example of a GUI screen including an entire display according to an HRV format.

FIG. 3 illustrates an example of a GUI screen including an entire display according to an HRV format.

The display according to the HRV format includes a header portion 301 and a data portion 302.

The header portion 301 includes a plurality of element type objects arranged in the horizontal direction. The "element type object" is a display object (for example, a display object in which a character string representing an element type name is displayed) representing the type of an element. An object column of the data portion 302 is immediately below the element type object. The "object column" has one or more display objects arranged in the vertical direction. By looking at the element type object, a user can understand the type of an element represented by a display object arranged immediately below the element type object. When the type of an element is obvious, the header portion may be omitted.

A plurality of element types represented by the header portion 301 maybe all of a plurality of element types detected by the management server 557 collecting information from respective elements of the information system 100 and may be partial element types among the plurality of detected element types. One or more element types among the plurality of element types represented by the header portion 301 are keys (references). Hereinafter, an element type used as a key is sometimes referred to as a "key type". An element type other than the key type is sometimes referred to as a "non-key type". In the present embodiment, it is assumed that one key type is used in order to simplify the description. The key type may be designated by a user operation or may be designated regardless of the user operation (for example, a key type registered in advance maybe acquired from the storage device 535 of the management server 557). According to the example of FIG. 3, the key type is "Storages". For example, an element type object corresponding to the key type among the element type objects is emphasized as illustrated in FIG. 3. In this way, the user can understand which one is the key type.

The data portion 302 includes a plurality of object columns arranged in the horizontal direction. Each object column has one or more display objects which are positioned immediately below a corresponding element type object and are arranged in the vertical direction as described above. Hereinafter, a display object in the object column is sometimes referred to as an "intra-column object".

An intra-column object corresponding to the key type is an element object (for example, a display object in which a character string representing an element name is displayed). Hereinafter, an element corresponding to the key type is sometimes referred to as a "key element," an element object of a key element is sometimes referred to as a "key object," and an object column corresponding to the key type is sometimes referred to as a "key column". Specifically, in the example of FIG. 3, a key element "VSP#02" corresponding to the example of FIG. 2 among a plurality of key elements (storage systems) belonging to the key type "Storages" is illustrated.

An intra-column object corresponding to the non-key type is an aggregation object (a display object representing aggregation information of one or more elements related to the corresponding key element). Hereinafter, an element corresponding to the non-key type is sometimes referred to as a "non-key element," a display object representing the aggregation information of one or more non-key elements is sometimes referred to as an "aggregation object," and an object column corresponding to a non-key type is sometimes referred to as a "non-key column". In the non-key column, one or more non-key elements corresponding to the aggregation object are related to a key element represented by a key object (a key object on a horizontal row) on the same row as the aggregation object. The aggregation information represented by the aggregation object is the number of non-key elements aggregated to the aggregation object. However, the aggregation information may include at least one of a representative state and a representative performance of one or more non-key elements instead of or in addition to the number. The "representative state" may be the worst state of one or more non-key elements and the "representative performance" may be the worst performance of one or more non-key elements. The aggregation information may be a result obtained by averaging or other statistical processing.

According to FIG. 3, a certain type is used as the key type and objects (key objects) of an element belonging to the key type are arranged in the vertical direction. Moreover, a plurality of aggregation objects belonging to each of a plurality of non-key types (element type objects arranged in the header portion) corresponding to a key object are arranged in a horizontal direction (on the same row as the key object) for respective key objects. The user can see the aggregation information of elements of the non-key type for a target key element as a list. In the example of FIG. 3, as described above, although the key type is "Storages," the key type may be switched arbitrarily. When the key type is switched, the data portion 302 is updated according to the above-described rules.

The element object (for example, the key object) and the aggregation object are examples of intra-column objects, and the display object such as the intra-column object and the element type object may be represented by various forms such as, for example, an icon, a rectangular figure, or a circular figure as long as the number of elements or an element name can be displayed in the display object.

In the present embodiment, a display format in which the relation with a key element is expressed in a horizontal direction is referred to as a horizontal relation view (HRV) format as described above. Since the relation is expressed in a horizontal direction, it is desirable to express intra-column objects arranged in the horizontal direction in the same size. Strictly speaking, the relation may be expressed in any form as long as the following condition is satisfied. That is, a condition "even a portion of an intra-column object that is not related to a key object does not fall within an area created by the upper and lower ends of the key object and at least a portion of an intra-column object (an aggregation object and an element object related to the key object) related to the key object falls within the area created by the upper and lower ends of the key object" is to be satisfied. Strictly speaking, the "area created by the upper and lower ends of the key object" can be said to be an "area in which a strip-shaped area in which the key object extends in a horizontal direction and an area of an object column overlap," for example.

FIGS. 29 to 32 are diagrams illustrating cases in which the relation with a key element can be expressed in a horizontal direction. The display example illustrated in FIG. 30 does not satisfy the condition "even a portion of an intra-column object that is not related to a key object does not fall within an area created by the upper and lower ends of the key object and at least a portion of an intra-column object related to the key object falls within the area created by the upper and lower ends of the key object". This is because at least a portion of the second intra-column object from the top of the object column "SAN" is included in the area created by the upper and lower ends of a non-related key object "VSP#01".

However, as in the display example illustrated in FIG. 29, even when a related intra-column object is smaller than the key object, the user can understand the relation with the key object by moving the eyes in the horizontal direction.

Moreover, as in the display example illustrated in FIG. 31, even when a related intra-column object exceeds the area created by the upper and lower ends of the key object, it is possible to understand the relation (even if lines are not drawn). According to the display example illustrated in FIG. 31, although relation lines may be drawn, the display density may be further improved if relation lines are not drawn, since the display density is improved (decreased) due to introduction of the key object and the aggregation object.

Similarly to the display example illustrated in FIG. 32, the relation can be understood as long as the above-described condition is satisfied even if the key objects have different heights (even if the display objects related to a specific key object have different heights).

According to the description of FIG. 3 (and FIGS. 29 to 32), the following advantages are obtained, for example.

That is, in a general topology view format, since the relation between elements is expressed by connection lines, when the number of elements increases, the connection lines are entangled complexly, and it is very difficult to understand an element related to a certain element at a glance. On the other hand, according to the HRV format, since the relation between elements is expressed by a positional relation in the horizontal direction, a user only needs to see elements arranged in the horizontal direction by turning the eyes horizontally from a certain display object in order to detect an element related to the display object and can easily understand the aggregation information such as the number of related elements. That is, in the HRV format, the complexity of a process of detecting related elements does not depend on the number of related elements.

Moreover, in a general topology view format, since the relation between elements is expressed by lines, it is necessary to secure a drawing space for expressing lines and the amount of information that can be displayed on the screen other than the lines decreases. When the number of elements increases, the lines are entangles complexly, and it is necessary to secure a drawing space for expressing the lines. On the other hand, according to the HRV format, since it is not necessary to express lines, substantially the entire drawing space can be used for displaying other items of information. For example, it becomes easy to display information that users want to refer to such as operation information and performance information of each element and an occurrence state of an event.

Further, in a general topology view format, since an end-to-end relation between elements is expressed by lines, when the number of elements increases, it is very difficult to understand how many other elements are related to a certain element at a glance. On the other hand, in the HRV format, since the number of elements related to an element is displayed, it is possible to understand how many other elements are related to a certain specific element at a glance and to easily understand the influence on the other elements, or the state and the performance (although the elements are aggregated). Moreover, for example, when a user adds a new virtual machine, the user can perform a user operation such that a virtual machine is constructed on a hypervisor in which the added virtual machine has least influence on other elements. Thus, it is possible to guide the user operation.

<VEL Format>

Figure 4:
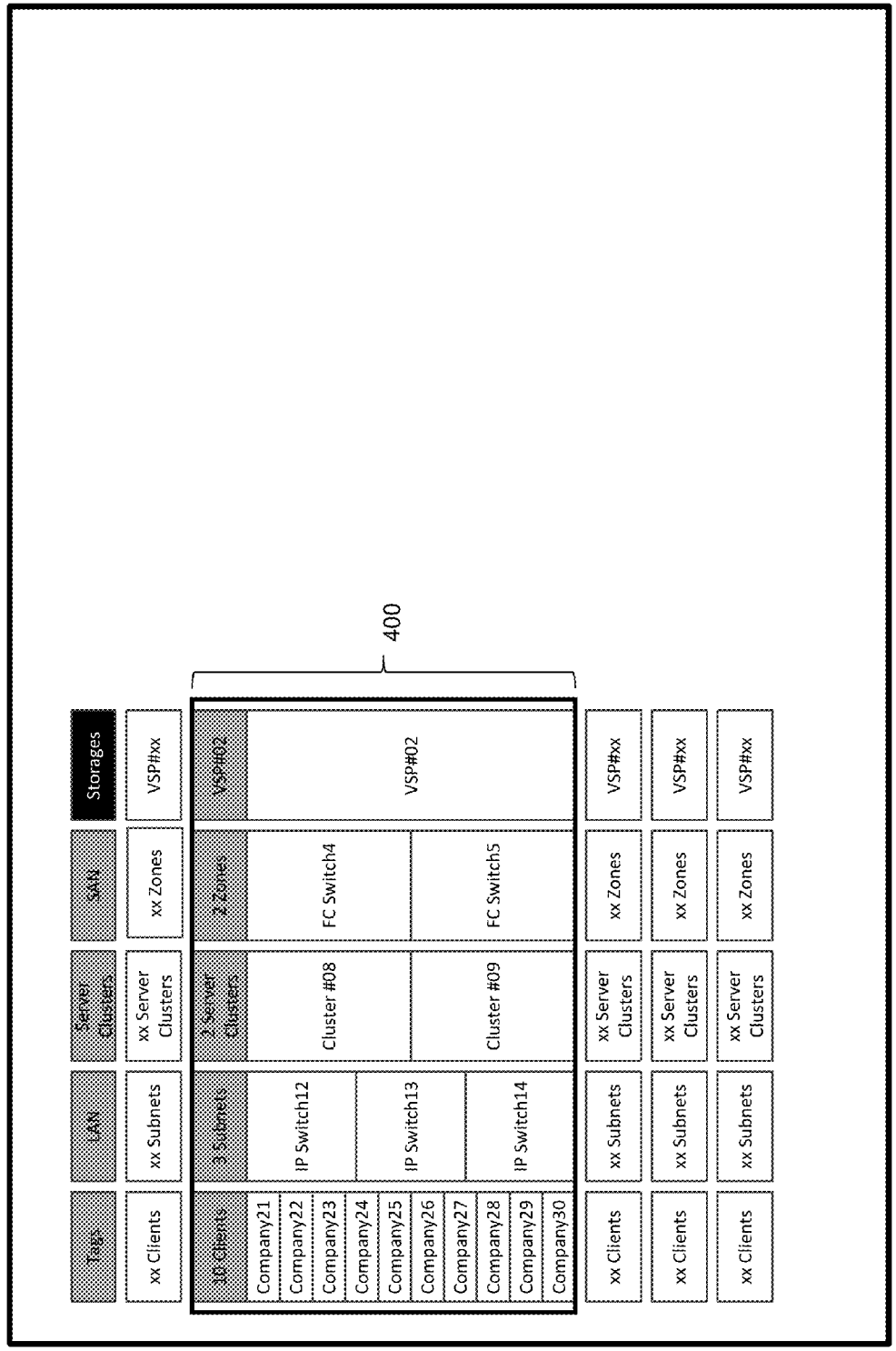
FIG. 4 illustrates an example of in-place deployment (VEL format).

FIG. 4 illustrates an example of an in-place deployment (VEL format) from the display illustrated in FIG. 3.

The display (the display in an in-place deployment row (a row subjected to in-place deployment) 400 in FIG. 4) according to the VEL format includes a header portion and a data portion similarly to the display according to the HRV format. The header portion includes element type objects arranged in the horizontal direction (the header portion may be omitted if the type is obvious). The data portion includes object columns (one or more display objects arranged in the vertical direction) of each of the element types represented by the header portion. A user can see a list of elements of the respective types. The format of display objects in the display according to the VEL format may comply with the format of display objects employed in the HRV format from the display consistency.

According to the display example of FIG. 4, elements are displayed in the in-place deployment row 400 with respect to a key element "VSP#02" corresponding to the in-place deployment row 400 according to a display format (that is, a vertical element list view (VEL) format) that illustrates a list of elements in the vertical direction. According to the VEL format, since the relation is not expressed in the horizontal direction, element objects in an object column may be expressed in different sizes for respective object columns (element types). For example, in the in-place deployment row 400, element objects of which the heights are reduced equally are arranged in the vertical direction for an object column having a large number of element objects, and element objects of which the heights are enlarged equally are arranged in the vertical direction for an object column having a small number of element objects.

In the display example of FIG. 4, the details (specifically, a list of all elements (elements related to a key element "VSP#02") aggregated to the aggregation object) of aggregation information are displayed in each of aggregation objects (in this example, object columns) in the in-place deployment row 400, corresponding to a corresponding key element "VSP#02". According to the display example of FIG. 4, although the element list is displayed for all aggregation objects of the in-place deployment row 400, an element type corresponding to an aggregation object for which the element list is displayed may be selectable. That is, an element list may be displayed for an aggregation object (column) only of an element type selected by a user, and the aggregation object (column) only may be displayed for an element type which is not selected.

In the display according to the HRV format, a user can determine a target row and can in-place-deploy the list of elements expressed in the row. Since the details of a target row only are displayed while maintaining an original display structure (screen structure), this display is referred to as "in-place deployment" in the present embodiment. The display example of FIG. 4 illustrates an example of in-place deployment of the display example of FIG. 3. In this example, in-place deployment is applied to a row (a row including the key object "VSP#02" and aggregation objects arranged on the lateral side thereof) corresponding to the key element "VSP#02". In the in-place deployment, any one of the HRV format and the VEL format can be selected independently from the original display format.

Figure 5:
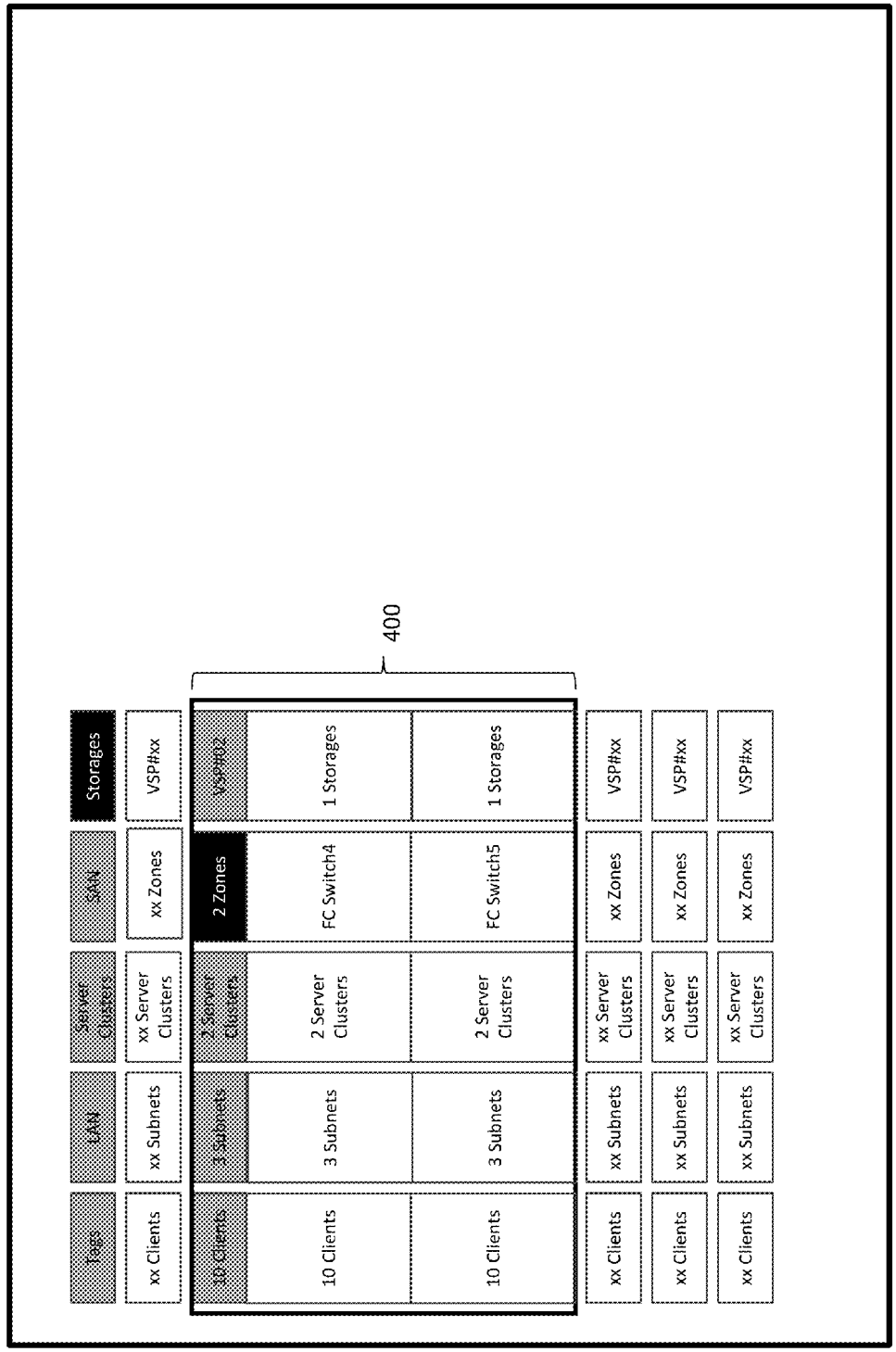
FIG. 5 illustrates an example of in-place deployment (HRV format).

In the example of FIG. 4, the original display format is the HRV format and the display format of in-place deployment is the VEL format. It is possible to display detailed information which is a list of elements related to a key element "VSP#02" designated by a user operation by the in-place deployment while displaying the overall relation around the key type "Storages". When the original display format is the HRV format and the display format of the in-place deployment is the HRV format, by setting the in-place deployment to an HRV format which uses another type as the key, it is possible to express elements related to the key element "VSP#02" using the other type as the key. For example, according to the display example of FIG. 5, in the in-place deployment row 400, elements related to the key element "VSP#02" are expressed using another type "2 Zones" ("SAN") as the key. That is, in the in-place deployment row 400, the key type is "2 Zones" ("SAN") (an element type object representing key type "2 Zones" is emphasized). Moreover, in the in-place deployment row 400, in an object column corresponding to the key type "2 Zones" ("SAN"), the element objects (key objects) "FC Switch4" and "FC Switch5" of all elements belonging to the key type and related to the element "VSP#02" are displayed (arranged vertically). Moreover, in the in-place deployment row 400, an aggregation object representing aggregation information of one or more non-key elements related to both the key element and the element "VSP#02" is displayed in an area (an area created by the upper and lower ends of each of the key objects "FC Switch4" and "FC Switch5") of the object column corresponding to a type other than the key type. In the in-place deployment row 400, as illustrated in FIG. 5, all intra-column objects other than an intra-column object of an element belonging to the key type "2 Zones" ("SAN") maybe regarded as the aggregation object. However, at least one intra-column object (for example, the intra-column object of the original key element "VSP#02") other than the intra-column objects of the elements belonging to the key type "2 Zones" may be regarded as an element object rather than the aggregation object.

According to the description of FIG. 4 (and FIG. 5), the following advantages are obtained, for example.

When there are a number of elements, although it is difficult to display all elements, since target elements are narrowed according to the HRV format and are subjected to in-place deployment according to the VEL format, it is possible to display detailed information of the target elements while decreasing the overall amount of information. When the in-place deployment of FIG. 4 is performed in the display of FIG. 3, a display area to which the in-place deployment is applied is displayed in such a way that a selected original row is displayed at an enlarged scale. That is, the details are displayed while maintaining the display structure (screen structure) before the in-place deployment is applied. Thus, it is possible to reduce the movement of the eyes of the user and the user can focus on an intended operation without interrupting the user's thinking. Thus, the management server program enlarges display areas such that the display area of the in-place deployment at least partially overlaps the display area of an original row (it is preferable that the original row is included).

Further, the upper and lower rows other than the original row may be moved to avoid the other rows from being concealed by the display area of the in-place deployment. By doing so, the user can obtain the detailed information of a designated row in addition to the information obtained according to the HRV format. Moreover, the user can easily understand the transition from the display of FIG. 3 to the display of FIG. 4 after the deployment is applied.

Figure 6:
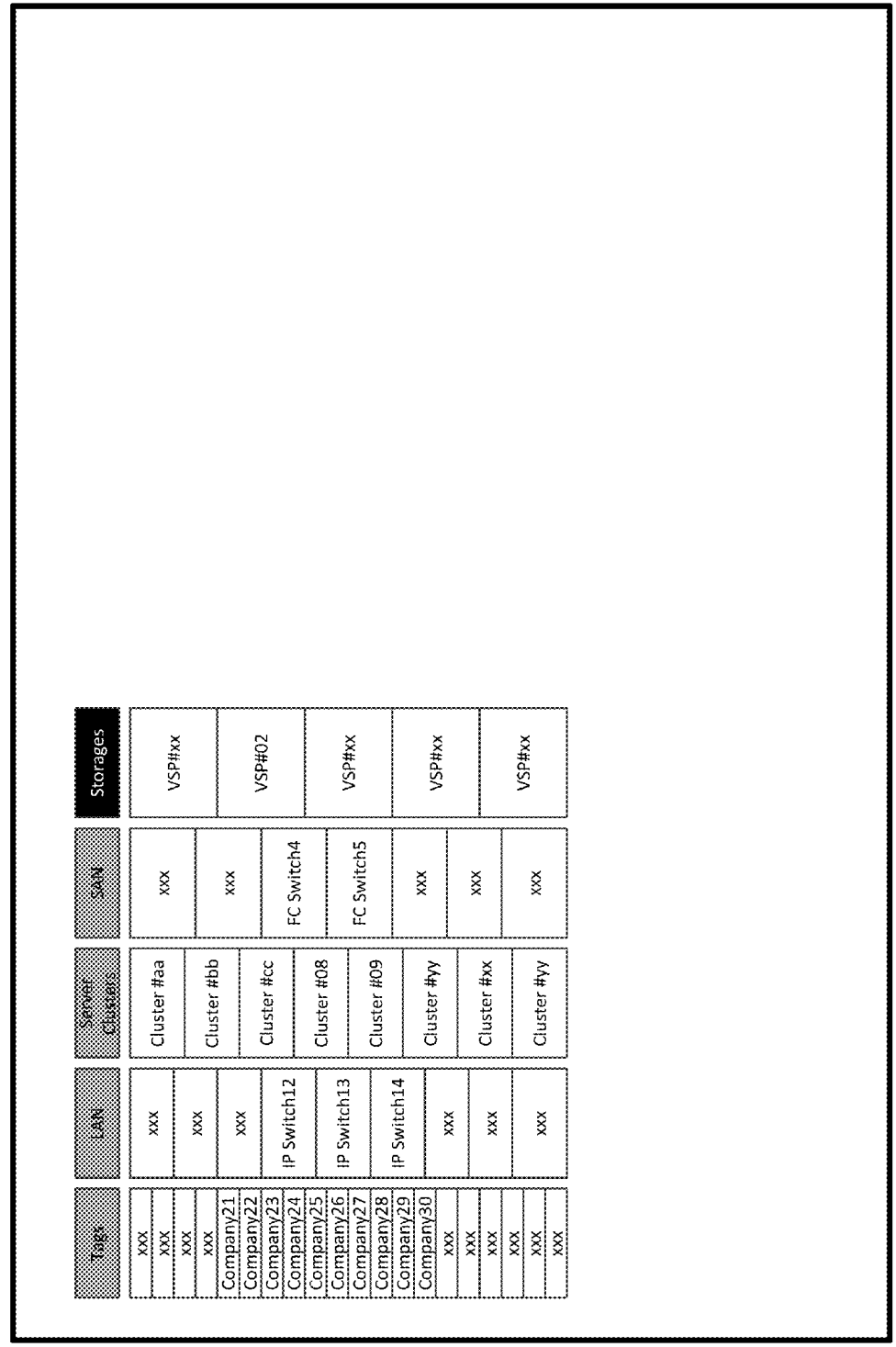
FIG. 6 illustrates a comparative example of FIG. 4.

Such a display as illustrated in FIG. 6 may be used rather than enlarging the target row as in the in-place deployment of the VEL format as long as the display illustrates the details in a simple form. However, the in-place deployment of the VEL format as illustrated in FIG. 4 is preferable from the viewpoint of the visibility or the like.

Moreover, the in-place deployment is not a substitution or a diversion of deployment of folders in file system management. Folder deployment involves an operation of opening a folder only, and an attribute (corresponding to the element type mentioned in the present embodiment) is not present in the folder itself. Such folder deployment cannot be simply applied to management of an information system having a plurality of elements of a plurality of types.

<Column Deployment>

An element having a plurality of components (sub-elements) of a plurality of types may be present. Elements may be subjected to column deployment for the purpose of displaying components (sub-elements) included in the element.

Figure 7:
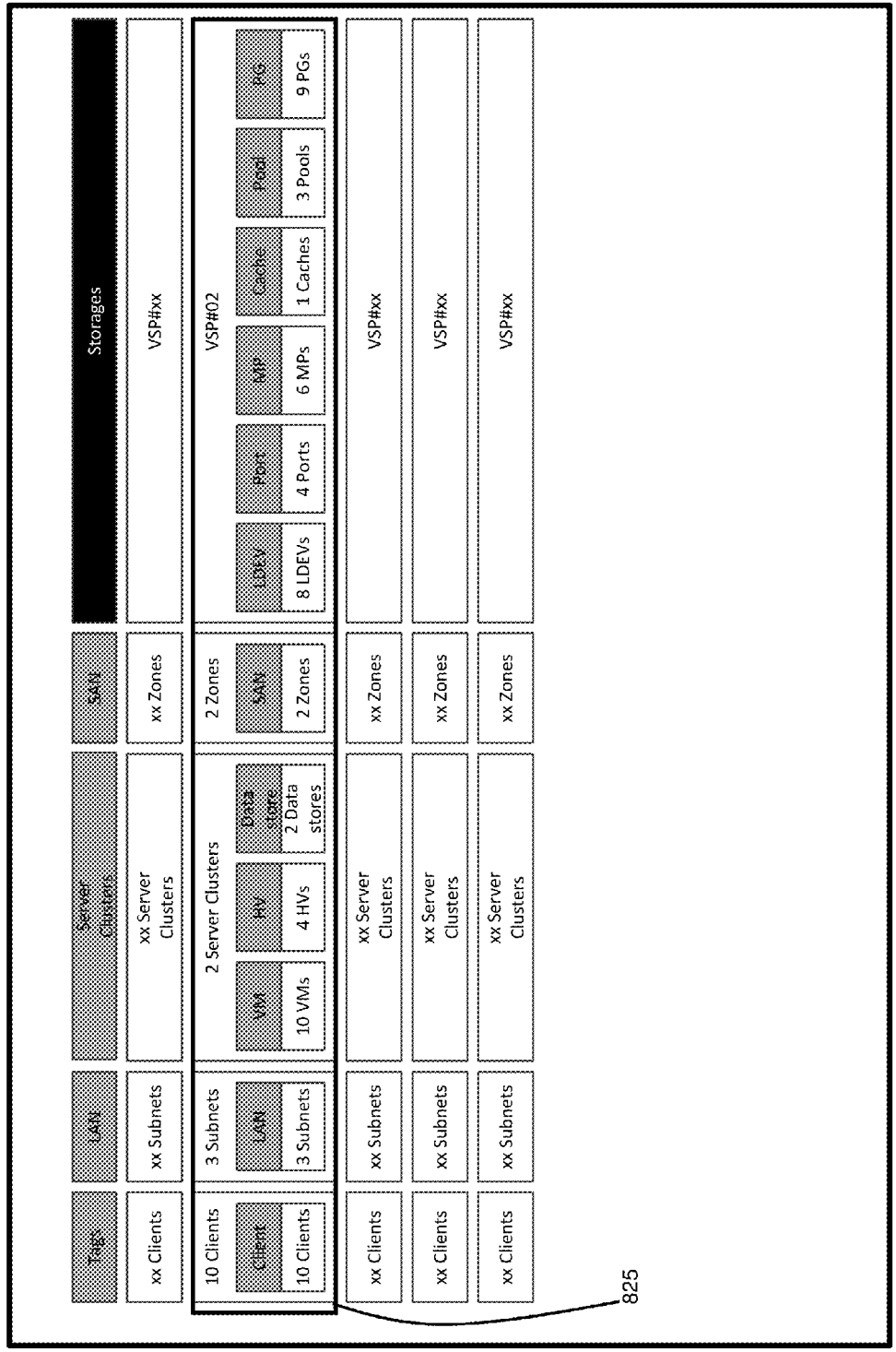
FIG. 7 illustrates an example of column deployment.

FIG. 7 illustrates an example of column deployment from the display of any one of FIGS. 3 to 5.

In the illustrated example, column deployment is applied to a row (a key object and an aggregation object on the same row as the key object) including the key element "VSP#02". A row (display area) 825 subjected to the column deployment is subdivided into components (sub-elements), and the relation is displayed in the level of components included in the element. Specifically, for example, for the key element "VSP#02," a display object (depicted in gray in the drawing)

representing a component type and an aggregation object representing the aggregation information (number) of components are displayed in the display object of the key element for each type of components included in the key element. Moreover, for an element type (for example, "Server Clusters") other than the key type "Storages", a display object (depicted in gray in the drawing) representing the component type (for example, "VM") and an aggregation object (for example, "10 VMs") representing the aggregation information (number) of components are displayed in an aggregation object (for example, "2 Server Clusters") corresponding to the key element "VSP#02" for each type of components belonging to the element type.

Similarly to the in-place deployment, in the column deployment, in order to reduce the movement of the eyes of the user, display areas are displayed so that the display areas of rows do not move greatly (overlap at least partially) before and after the column deployment is performed and the rows other than the row to which the column deployment is applied are moved up and down. Although all columns are subjected to the deployment in FIG. 7, the lateral length of the row may be set to be equal to or smaller than the GUI screen by subjecting partial columns only to the deployment. Moreover, at least a large part of all display objects which are newly displayed by the column deployment, which can be observed by the same movement of eyes (movement of eyes in the horizontal direction) as the movement of eyes in the HRV format are arranged in the horizontal direction in the row (display area) 825 to which column deployment is applied. The number of target rows in which sub-elements are displayed according to the column deployment may be one or plural, and all rows may be subjected to the sub-element display according to the column deployment.

<In-place Deployment after Column Deployment>

For column deployment of components included in an element, the list of elements (in this case, components) may be subjected to in-place deployment.

Figure 8:
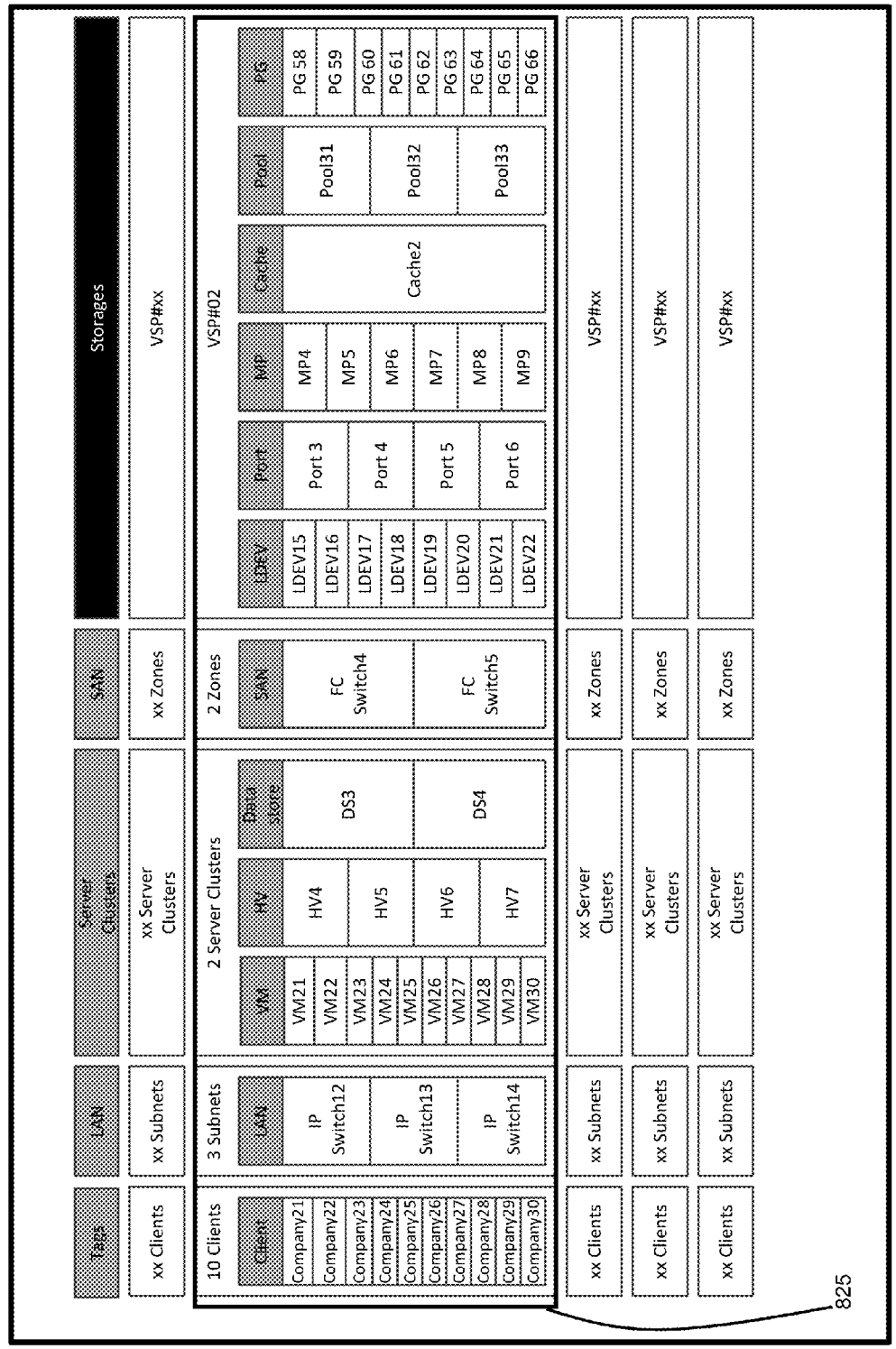
FIG. 8 illustrates an example of in-place deployment for column deployment.

FIG. 8 illustrates an example of in-place deployment for the column deployment of FIG. 7.

In the illustrated example, a detailed list of elements is displayed according to in-place deployment for a row which includes the key element "VSP#02" and to which column deployment is applied. The row 825 to which column deployment and in-place deployment are applied has an element list which complies with the VEL format. Specifically, the display objects of all components belonging to each type of components included in the key element are displayed in the key object for each component type. Moreover, display objects of all components belonging to the component type are displayed in an aggregation object for each type other than the key type.

In the in-place deployment within the column deployment, the original display format and the display format of the in-place deployment can independently select the two display formats the HRV format and the VEL format. For example, according to the examples of FIGS. 7 and 8, the original display format is the HRV format and the display format of the in-place deployment is the VEL format. However, according to this example, it is possible to display the detailed information which is the detailed list of elements related to the key element "VSP#02" in the in-place deployment while expressing the overall relation around the key element (storage system) "VSP#02" in the original display. The display of FIG. 3 or the like may transition to the display of FIG. 8 in response to a user operation directly without via the column deployment of FIG. 7.

<Display of Relation between Elements in VEL Format>

In the VEL format, the relation between elements is not expressed. The present embodiment provides a scheme of enabling the relation between elements to be identified.

Figure 9:
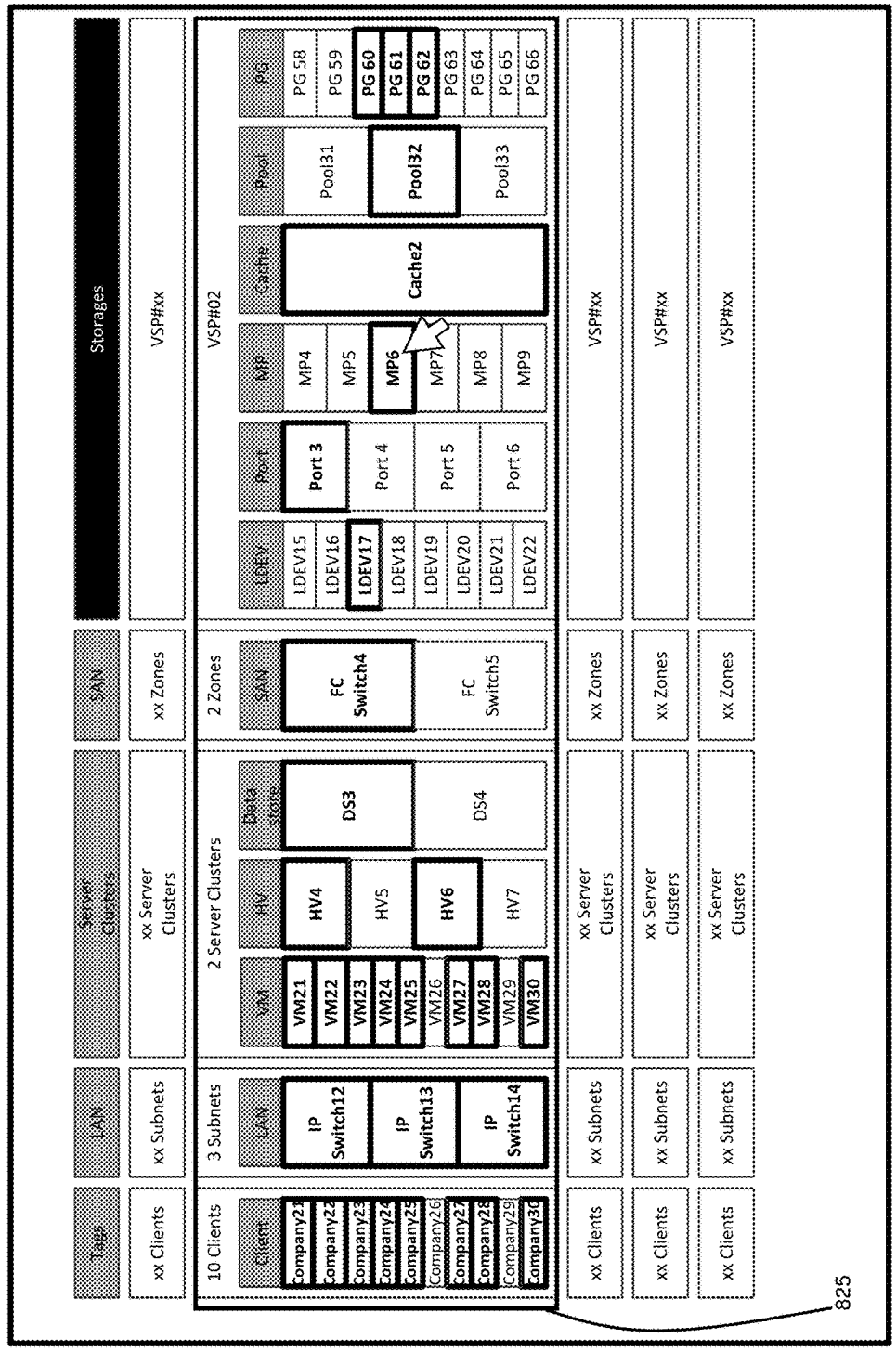
FIG. 9 illustrates an example of a display of relation between elements in in-place deployment (VEL format).

FIG. 9 illustrates an example of a display of the relation between elements in the in-place deployment (VEL format) of FIG. 8.

When a specific element is designated by a user operation (for example, the cursor of a mouse is overlaid on a certain element object), elements related to the element are specified and the element objects of the element are emphasized in each object column of the row 825. In this way, the user can identify the elements related to the designated element. Here, various methods for "emphasizing" such as changing the background color, blinking, attaching a mark to an object, and increasing the height of an object can be used. In this example, a display object of an element (component) related to the key element (component) "MP6" is emphasized by thickening the frame line of the display object.

In this example, elements other than the row 825 on which the user is focusing are also emphasized. However, since the user has selected the target element type (key type) and has been focusing on the element type, the elements other than the row on which the user is focusing are not emphasized in the present embodiment in order to suppress unnecessary information to allow the user to see the target clearly. For example, even if an element related to the element "MP6" is included in "Server Clusters" on the first row (the row one layer above the row 825), the aggregation object "xx Server Clusters" of "Server Cluster" on the first row is not emphasized.

In particular, since the number elements subjected to the display according to the VEL format after in-place deployment or column deployment is performed is not too large, even when the elements are emphasized, it is possible to display the designated element and the related elements (emphasized elements) simultaneously (in one screen) without any scroll. Moreover, even when a scheme of enabling the relation between elements to be identified even in the VEL format is not provided, it is possible to express the relation between elements by switching the display format to the HRV format in which the type of a specific element is designated.

Figure 10:
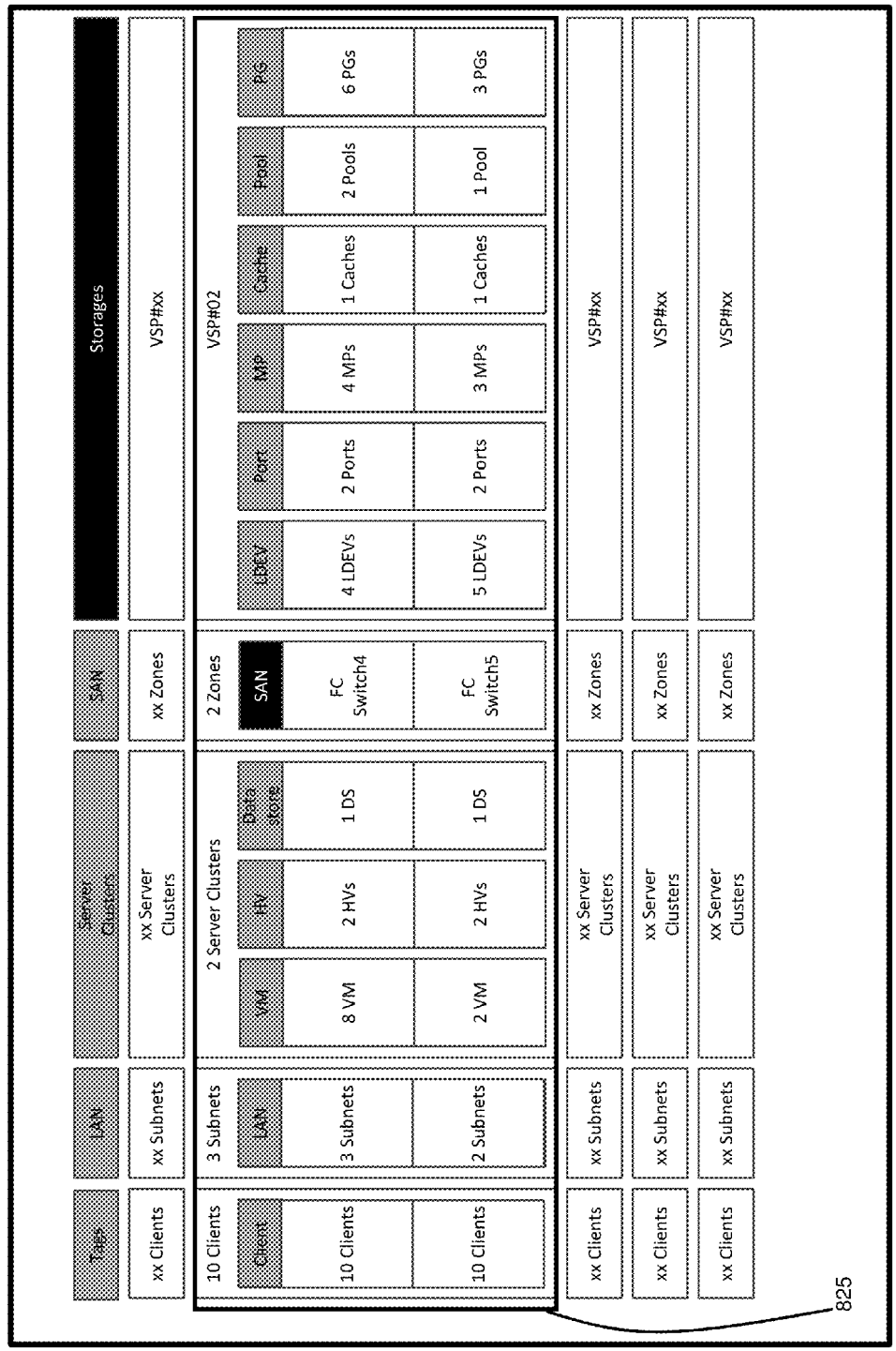
FIG. 10 illustrates a first example of in-place deployment (HRV format) after conversion from in-place deployment (VEL format).

FIG. 10 illustrates a first example of in-place deployment (HRV format) after conversion from the in-place deployment (VEL format) of FIG. 8.

According to the display example of FIG. 10, an element type "SAN" is designated as a key type, and in-place deployment (HRV format) is applied to the key type "SAN". According to the display example of FIG. 10, another key type is "SAN". In the row 825, the element objects "FC Switch4" and "FC Switch5" of all elements (sub-elements) which belong to the key type "SAN" and are related to the element "VSP#02" are displayed (specifically, the element objects are arranged vertically). Moreover, in the row 825, an aggregation object representing the aggregation information of one or more non-key elements (sub-elements) related to both the key element and the element "VSP#02" is displayed in an area (specifically, an area created by the upper and lower ends of each of the key objects "FC Switch4" and "FC Switch5") of an object column corresponding to types other than the key type "SAN".

Figure 11:
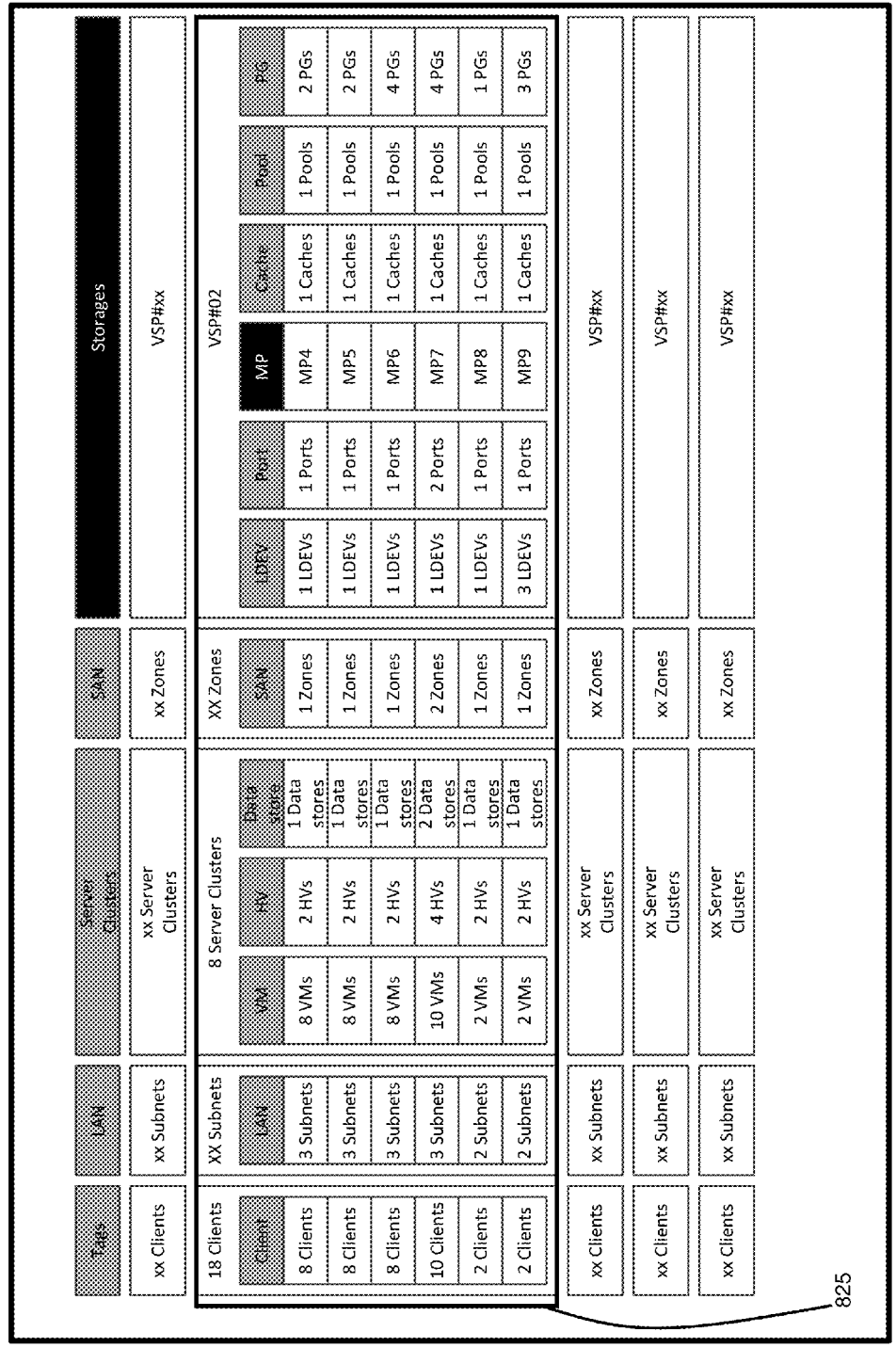
FIG. 11 illustrates a second example of in-place deployment (HRV format) after conversion from in-place deployment (VEL format).

FIG. 11 illustrates a second example of in-place deployment (HRV format) after conversion from the in-place deployment (VEL format) of FIG. 8.

In the display example of FIG. 11, elements are displayed according to the HRV format using the component type "MP" as a key type. That is, aggregation objects of other types of related elements are displayed for each MP in the key element "VSP#02". In this way, the user can identify the aggregation information such as the number of the other types of elements related to an arbitrary microprocessor (MP). Lines representing the relation between elements may be displayed in the display area of in-place deployment (see FIG. 31).

<Display Rule When There Are Many Management Target Elements>

In the present embodiment, information on elements that a user wants to focus on is displayed in one screen from the perspective of at least one of visibility and operability. The following display rules are used when there are many management target elements and it is not possible to display the elements in one screen.

(Display Rule 1)

A vertical width (the height) of an element object is decreased (that is, the object is displayed at a reduced scale). For example, the management server program 541 determines whether an object is to be displayed at a reduced scale for each object column based on a value obtained by dividing "displayable pixel value" (for example, a pixel value representing the largest length in a vertical direction of an object column) by "number of elements" (the number of element objects included in the object column). Specifically, for example, when the calculated value is one pixel or less, one-pixel display is performed in an allowable maximum number. Here, "one-pixel display" is a display in which one display object is drawn by lines corresponding to one pixel. The "allowable maximum number" is the largest number of lines corresponding to one pixel, which can be displayed within a height range of an object column among X display objects (X is a natural number). Thus, when it is not possible to display all of the X element objects by lines within a height range of the object column, the number of element objects displayed is decreased to the allowable maximum number or less. Since there is no user operation that designates an element while maintaining one-pixel display, the screen including a reduced-scale display may only need to show that there are a number of elements. However, vertical Y elements (Y is a natural number, for example, Y=3) and a display area (the height of an element object) in which an element name can be identified are secured so that an object displayed in a column can be understood.

(Display Rule 2)

An element object displayed at a reduced scale is enlarged so that an element name can be identified only "when it is necessary". The followings are specific examples of "when it is necessary". That is, the specific example of "when it is necessary" may be at least one of a display of retrieval results, a display of elements where an error occurred (this is a display based on the table 544 indicating error information representing, for example, the presence of an error in each element), a display of an element designated by the user, and a display of an element specified as the cause of errors as the result of root cause analysis (RCA).

At least one of Display Rules 1 and 2 described above can be applied to any one of the HRV format and the VEL format.

Figure 12:
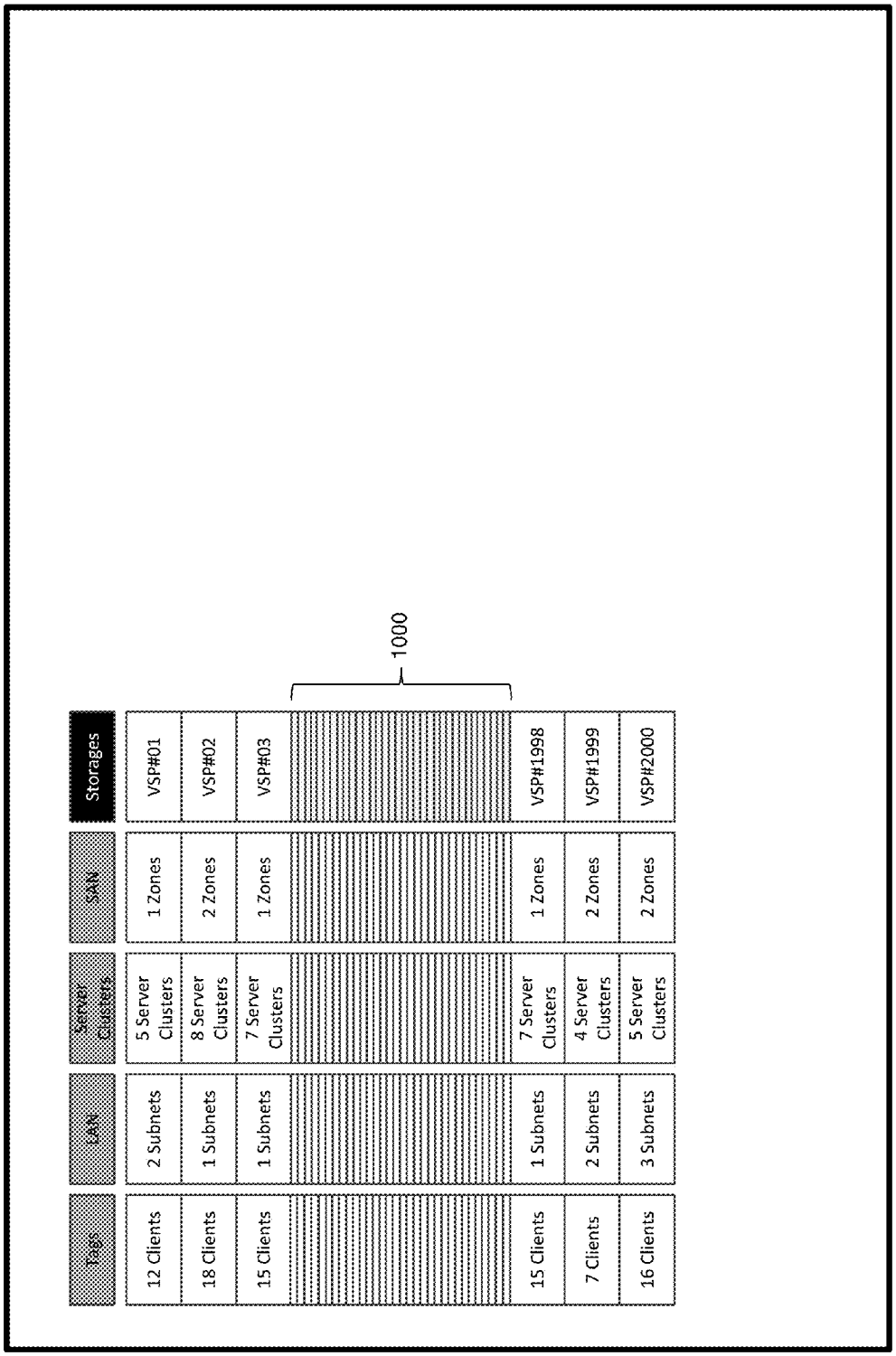
FIG. 12 illustrates an example of a reduced-scale display according to Display Rule 1, in an HRV format.

FIG. 12 illustrates an example of a reduced-scale display according to Display Rule 1, in the HRV format.

Since there are a number of elements (since the value of the calculation formula described in Display Rule 1 is one pixel or less), elements other than the vertical Y elements (in the example of FIG. 12, Y=3) are displayed at a reduced scale while maintaining the horizontal relation. The display area of the reduced-scale display is an area indicated by reference numeral 1000.

Figure 13:
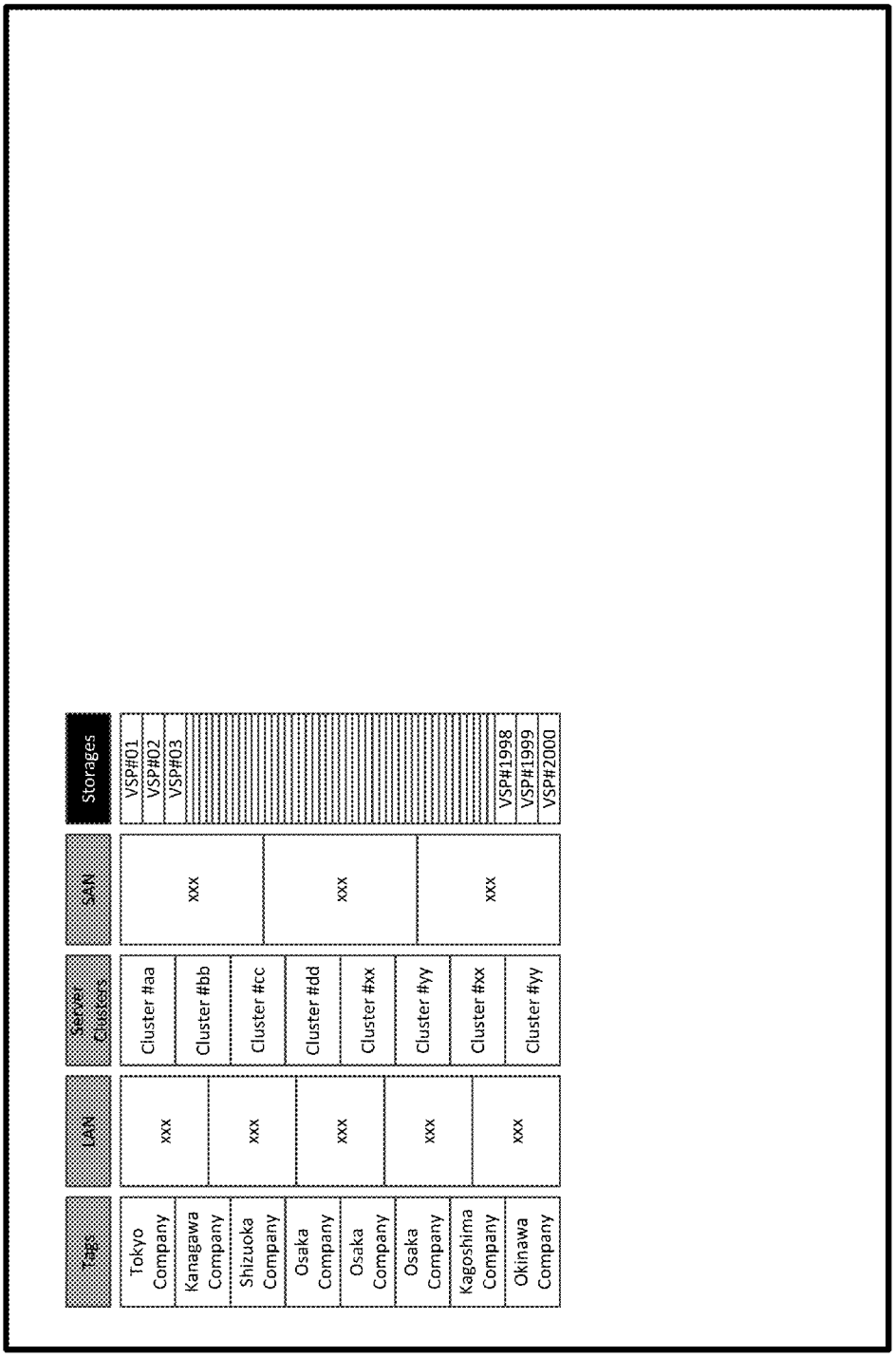
FIG. 13 illustrates an example of a reduced-scale display according to Display Rule 1, in a VER format.

FIG. 13 illustrates an example of a reduced-scale display according to Display Rule 1, in the VER format.

A reduced-scale display may be applied to the VEL format similarly to when there are a number of elements in the HRV format. In the case of the VEL format, since the line of intra-column objects (element objects) is meaningless, the size (height) of the element object of one element may be determined for each column according to the number of elements belonging to the column.

Figure 14:
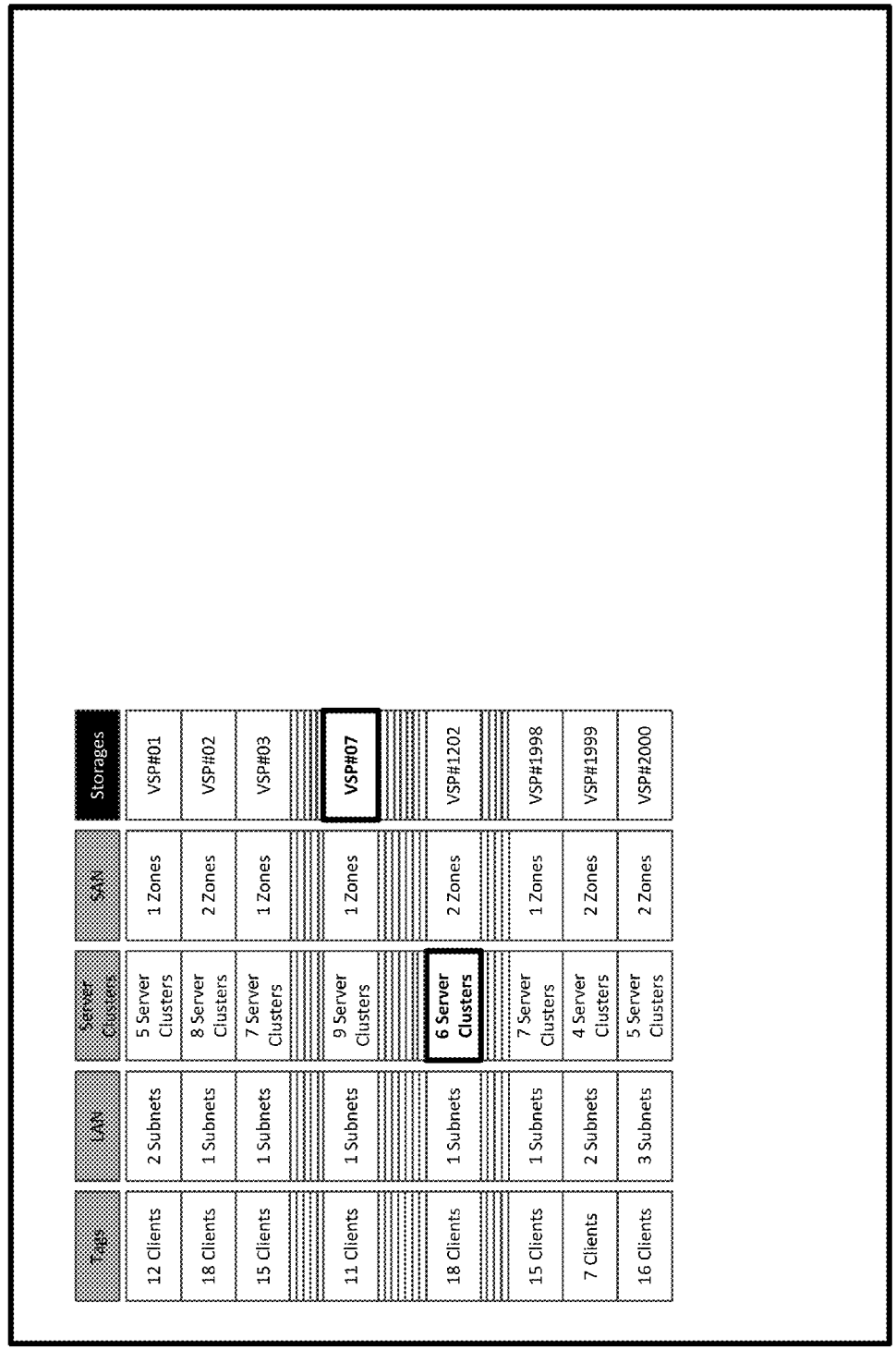
FIG. 14 illustrates an example of a reduced-scale display according to Display Rule 2.

FIG. 14 illustrates an example of a reduced-scale display according to Display Rule 2.

According to the display example of FIG. 14, the "display of retrieval results" is adopted as an example for description of Display Rule 2. A key column and a non-key column result in the following differences. That is, in a key column, an element object of an element that satisfies retrieval conditions is emphasized (in the drawing, the frame of the corresponding display object is expressed by a bold line), and the size (height) of all intra-column objects in a row that includes the element object is increased. On the other hand, in a non-key column, an aggregation object representing the aggregation information of one or more elements including an element that satisfies retrieval conditions is emphasized, and the size (height) of all intra-column objects in a row that includes the aggregation object is increased.

Figure 15:
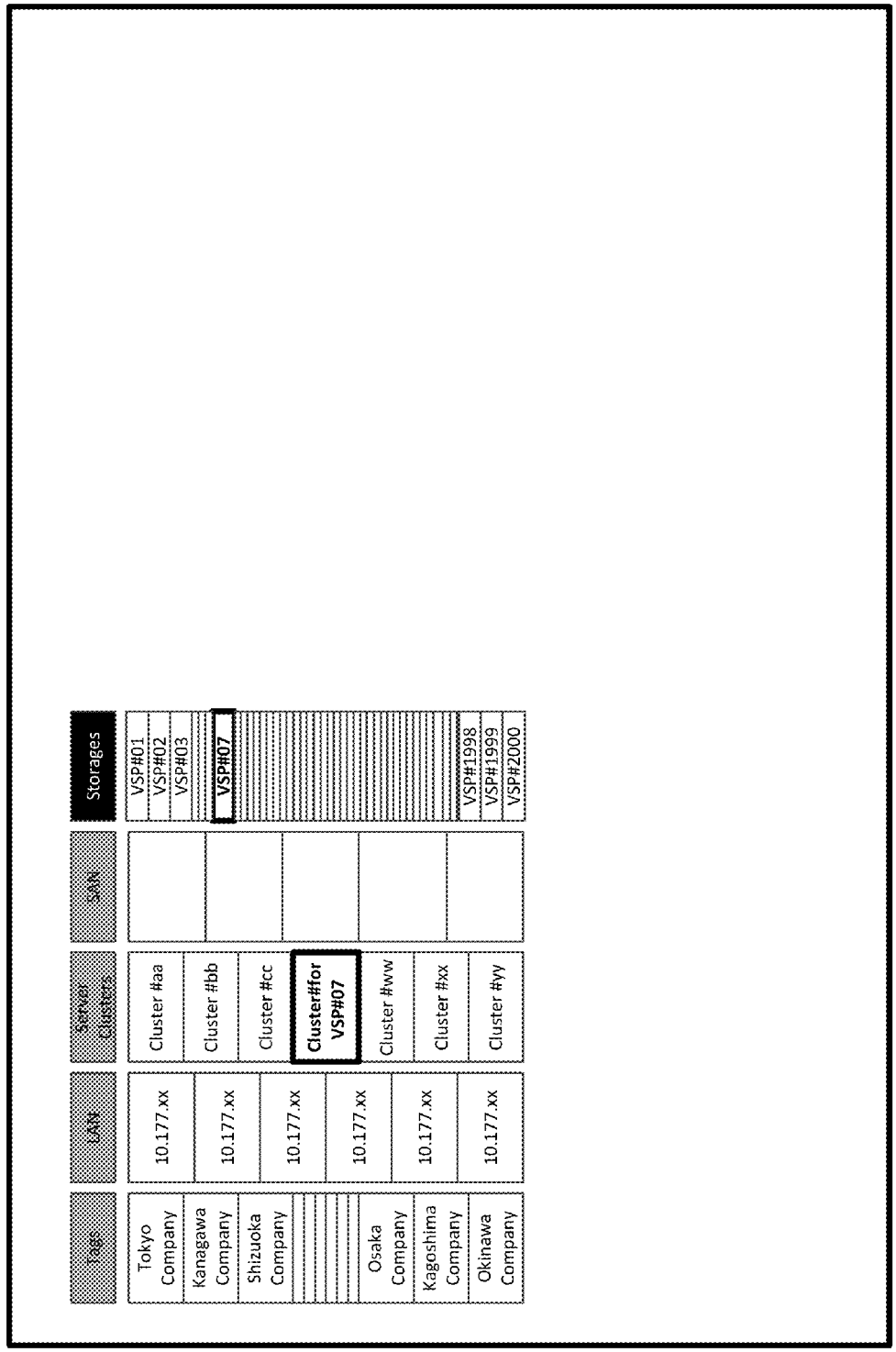
FIG. 15 illustrates an example in which only a display object of an element that satisfies conditions is displayed at an enlarged scale.

If all intra-column objects in a row are emphasized strictly, when a plurality of elements satisfies the retrieval conditions, the number of rows in which intra-column objects are displayed at an enlarged scale increases and the visibility may deteriorate. At least in this case, the size of only the intra-column objects (element objects or aggregation objects) corresponding to the elements that satisfy the retrieval conditions may be increased. An example thereof is illustrated in FIG. 15. Specifically, FIG. 15 illustrates an example in which in a reduced-scale display according to the VEL format, only the intra-column objects corresponding to the elements that satisfy the retrieval conditions are displayed at an enlarged scale (and emphasized). Unlike the HRV format, the other intra-column objects in a row that includes the intra-column object displayed at an enlarged scale are not enlarged.

As described above, whether only an intra-column object (hereinafter referred to as a condition-satisfying object) that satisfies conditions such as the retrieval condition or all other intra-column objects in a row that includes the condition-satisfying object as well as the condition-satisfying object will be displayed at an enlarged scale may be controlled based on, for example, whether the display format is the VEL format or the HRV format as described above or whether the number of rows that include the condition-satisfying object is equal to or larger than a predetermined value. For example, when the number of rows that include the condition-satisfying object is smaller than the predetermined value, all intra-column objects in the row that includes the condition-satisfying object may be displayed at an enlarged scale.

In any of the display formats, when a plurality of condition-satisfying objects is present, all condition-satisfying objects are displayed at an enlarged scale. When there are too many condition-satisfying objects to display all condition-satisfying objects at an enlarged scale, information such as a message representing that retrieval is to be performed again by narrowing the retrieval conditions may be displayed.

According to the description of FIGS. 12 to 15, the following advantages are obtained, for example.

That is, although it is difficult to display all elements if there are too many elements, it is possible to decrease the amount of information to be checked by the user by emphasizing only the elements that the user has to focus on. Moreover, a state in which there is no emphasized element indicates that there is no element to be focused on, and the presence of a problem can be visually expressed.

<Modified Example of Display Rule 2 When There Are Many Management Target Elements>

In "Display Rule 2 when there are many management target elements," although the size of the intra-column object displayed at a reduced scale is increased only "when it is necessary" so that the element name can be identified, the object may be emphasized by various methods such as changing the background color or blinking (for example, as illustrated in FIG. 14, the frame line of the enlarged intra-column object is thickened).

<GUI Transition Example>

Figure 16:
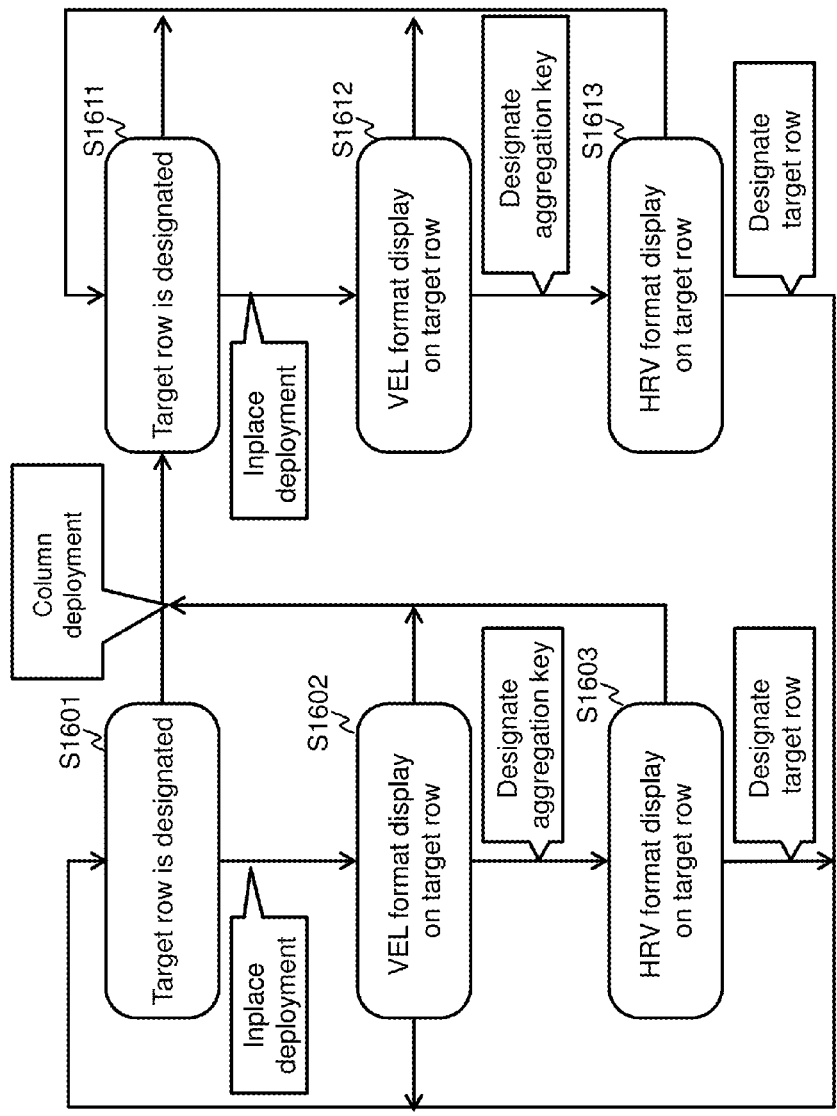
FIG. 16 illustrates an example of transition of a GUI screen.

FIG. 16 illustrates an example of transition of the GUI screen.

The management server program 541 displays a GUI screen in which a target row and a key type are designated (S1601). The GUI screen is a GUI screen that includes a display in the HRV format and is the GUI screen illustrated in FIG. 3. In the example of FIG. 3, the target row is a row that includes the key element "VSP#02" and the key type is "Storages".

In a state in which the GUI screen in which the target row and the key type are designated is displayed, when a user operation corresponding to in-place deployment that designates to display all objects is detected, the management server program 541 performs in-place deployment (VEL format) on the target row (S1602). An example of this in-place deployment is illustrated in FIG. 4.

In a state in which the GUI screen including this in-place deployment is displayed, when a user operation corresponding to in-place deployment that designates an aggregation key type is detected, the management server program 541 performs in-place deployment (HRV format) on the target row (S1603). The "aggregation key type" is a key type which is a non-key type and to which an aggregation object belongs. An example of this in-place deployment is illustrated in FIG. 5.

In a state in which the GUI screen of any one of S1601 to S1603 is displayed, when a user operation corresponding to column deployment is detected, the management server program 541 performs column deployment on the target row (S1611). An example of this column deployment is illustrated in FIG. 7. Specifically, the management server program 541 displays an aggregation object of a sub-element of an element corresponding to each of intra-column objects in the target row (a row including "VSP#02") in each intra-column object. The "intra-column object" and the "element corresponding to the intra-column object" mentioned herein are "VSP#02," "2 Zones," "2 Server Clusters," and the like. Examples of the "sub-element" include "PG," "Pool," and the like when the element is "VSP#02" and include "VM," "HV," and "Data store" when the element is "2 Server Clusters". Examples of the "aggregation object" include "9 PGs," "3 Pools," and the like when the element is "VSP#02" and include "10 VMs," "4 HVs," and "2 Data stores" when the element is "2 Server Clusters".

In a state in which the GUI screen including this column deployment is displayed, when a user operation corresponding to in-place deployment that designates to display all objects is detected, the management server program 541 performs in-place deployment (VEL format) on the target row (S1612). An example of this in-place deployment is illustrated in FIG. 8. That is, an element object of each of sub-elements (components) aggregated to each of aggregation objects in the column deployment displayed in S1611 is displayed for each aggregation object.

In a state in which the GUI screen including this in-place deployment is displayed, when a user operation corresponding to in-place deployment that designates an aggregation key type is detected, the management server program 541 performs in-place deployment (HRV format) on the target row (S1613). The "aggregation key type" is a key type which is a non-key type (a non-key type of a sub-element) in the column deployment and to which an aggregation object belongs. An example of this in-place deployment is illustrated in FIG. 10.

In a state in which the GUI screen of any one of S1612 and S1613 is displayed, when a user operation that designates at least one of another target row and another key type is detected, the management server program 541 performs column deployment on the designated other target row and/or the designated other key type (S1611).

In a state in which the GUI screen of any one of S1602, S1603, S1611, S1612, and S1613 is displayed, when a user operation that designates at least one of another target row and another key type is detected, the management server program 541 performs initial HRV format display on the designated other target row and/or the designated other key type (S1601).

Hereinafter, the process performed by the management server program 541 and an example of information referred to in the process are described.

The management server program 541 can collect configuration information from all elements (for example, all nodes) in the information system 100 or predetermined one or more elements in the information system 100 and construct tables illustrated in FIGS. 17A, 17B, and 18, for example, based on the collected configuration information. The tables illustrated in FIGS. 17A, 17B, and 18 are the tables included in the table 543. That is, the information represented by the tables illustrated in FIGS. 17A, 17B, and 18 is one of the items of configuration information represented by the table 543. The management server program 541 can detect a plurality of elements based on the constructed tables.

FIG. 17A illustrates an example of an element list table.

An element list table 1700 is a list of all elements in the information system 100. Specifically, for example, the table 1700 has items for each element, the items including "element ID" which is identification information allocated to an element, "element name" which is the name of the element, and "element type" which is the name of the type of the element.

FIG. 17B illustrates an example of an element relation table.

An element relation table 1710 illustrates the relation between elements. Specifically, for example, the table 1710 has items for each element, the items including "element ID" and "relation element ID" which is the ID of an element related to the element.

FIG. 18 illustrates an example of an element type relation table.

An element type relation table 1800 illustrates the relation between element types. Specifically, for example, the table 1800 has items for each element type, the items including "element type" which is the name of an element type and "child element type" which is an element type to which the element type belongs.

The tables illustrated in FIGS. 17A, 17B, and 18 illustrate such a topology configuration as illustrated in FIG. 2 and the relation between element types. If an identification name (for example, common name+identification number) such as "VM#01" and "VSP#02" is used, these identification names represent elements. If a common name rather than an identification name such as "VM" and "VSP" is used, these common names represent element types.

The management server program 541 receives error information from all elements (for example, all nodes) in the information system 100 and registers the received error information in the table illustrated in FIG. 19, for example. The table illustrated in FIG. 19 is a table included in the table 544. That is, the information represented by the table illustrated in FIG. 19 is one of the items of the error information represented by the table 544. The management server program 541 can understand the time of occurrence of an error and the element in which an error has occurred based on the constructed table.

FIG. 19 illustrates an example of an element error table.

The element error table 1900 has items for each error, the items including "element ID" which is identification information of an element in which an error has occurred, "error type" which is the type of an error occurring in the element, "occurrence time" which is the time a which an error has occurred, and "error message ID" which is identification information of an error message.

Figure 20:
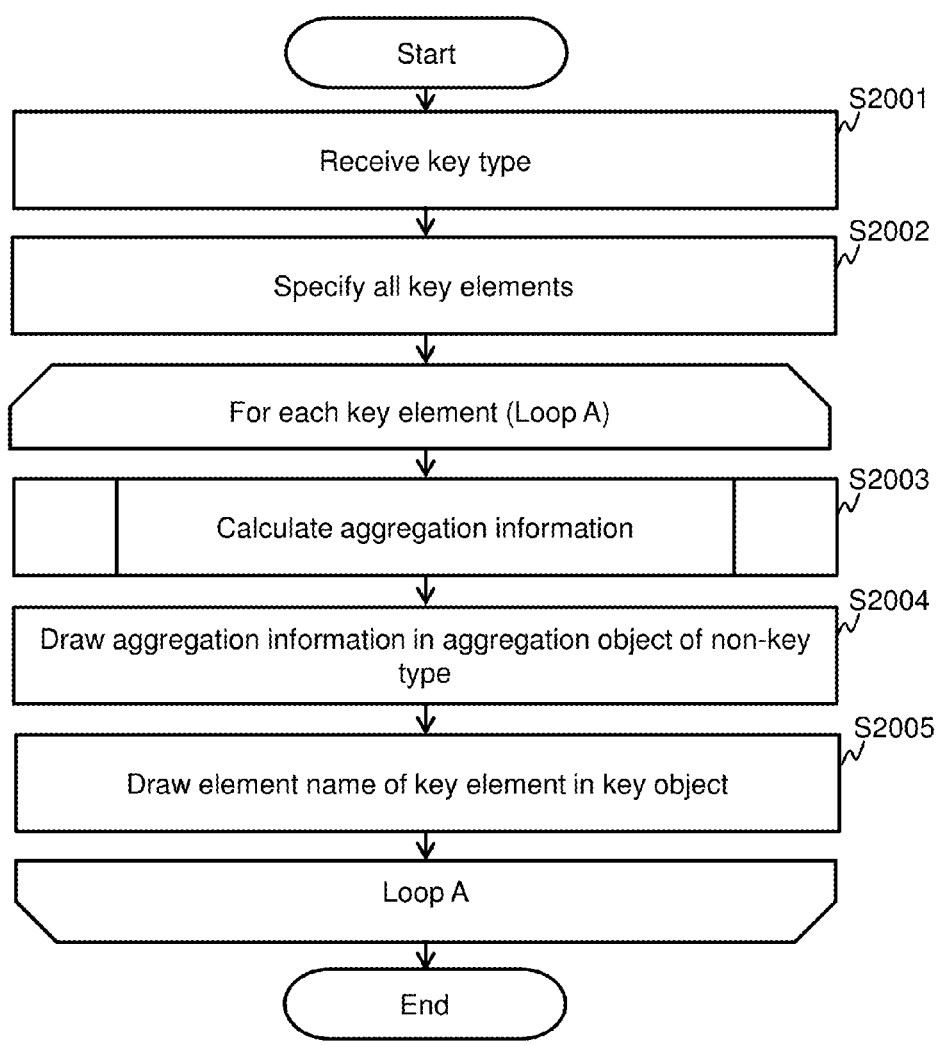
FIG. 20 illustrates an example of the flow of an HRV format display process.

FIG. 20 illustrates an example of the flow of an HRV format display process.

The management server program 541 receives a key type ("element type" designated as a key type) from the management client 555 (S2001). The management server program 541 specifies all elements corresponding to the key type received in S2001 from the element list table 1700 (S2002).

The management server program 541 performs S2003 to S2005 with respect to each of the elements specified in S2002. Hereinafter, one element (referred to as a "target key element" in the description of FIGS. 20 and 21) is adopted as an example.

That is, the management server program 541 performs calculation (FIG. 21) of aggregation information for the target key element (S2003). Moreover, the management server program 541 arranges aggregation objects in the same row as the display object of the target key element with respect to each of element types other than the key type and draws the aggregation information (the number of elements) calculated in S2003 in each aggregation object (S2004). Moreover, the management server program 541 draws the element name (the element name specified from the element list table 1700) of the target key element in the display object of the target key element (S2005).

Figure 21:
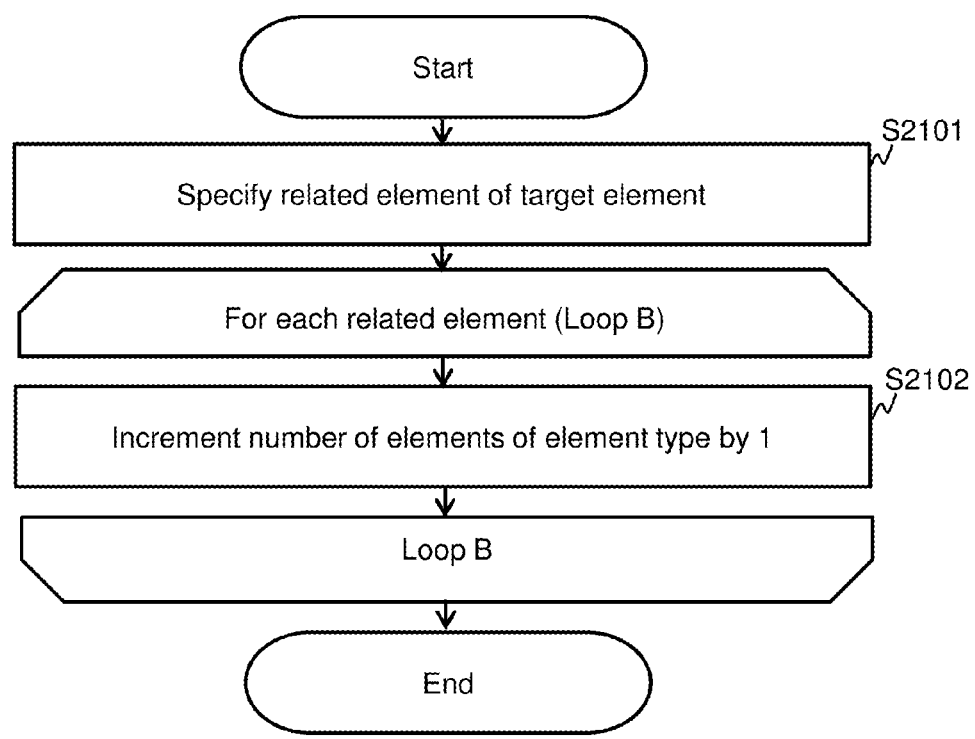
FIG. 21 illustrates an example of the flow of an aggregation information calculation process.

FIG. 21 illustrates an example of the flow of an aggregation information calculation process.

The management server program 541 specifies all relation elements corresponding to the target key element from the element relation table 1710 (S2101) and performs S2102 with respect to each of the relation elements specified in S2101. Hereinafter, one relation element (referred to as a "target relation element" in the description of FIG. 21) is adopted as an example.

The management server program 541 specifies an element type corresponding to the target relation element from the element list table 1700 and increments the number of relation elements of the specified element type by 1 (S2102).

Figure 22A:
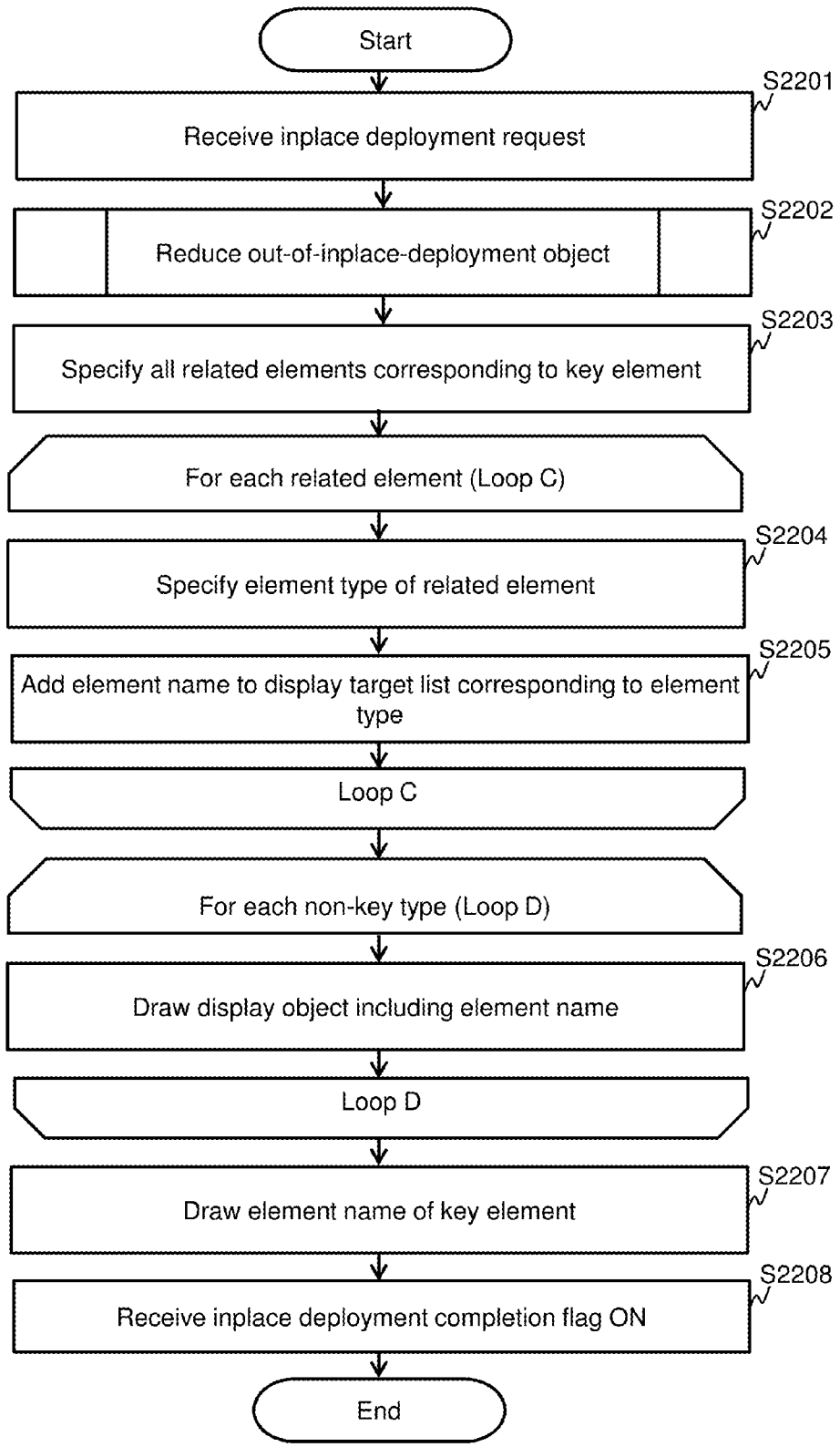
FIG. 22A illustrates an example of the flow of an in-place deployment process.
Figure 22B:
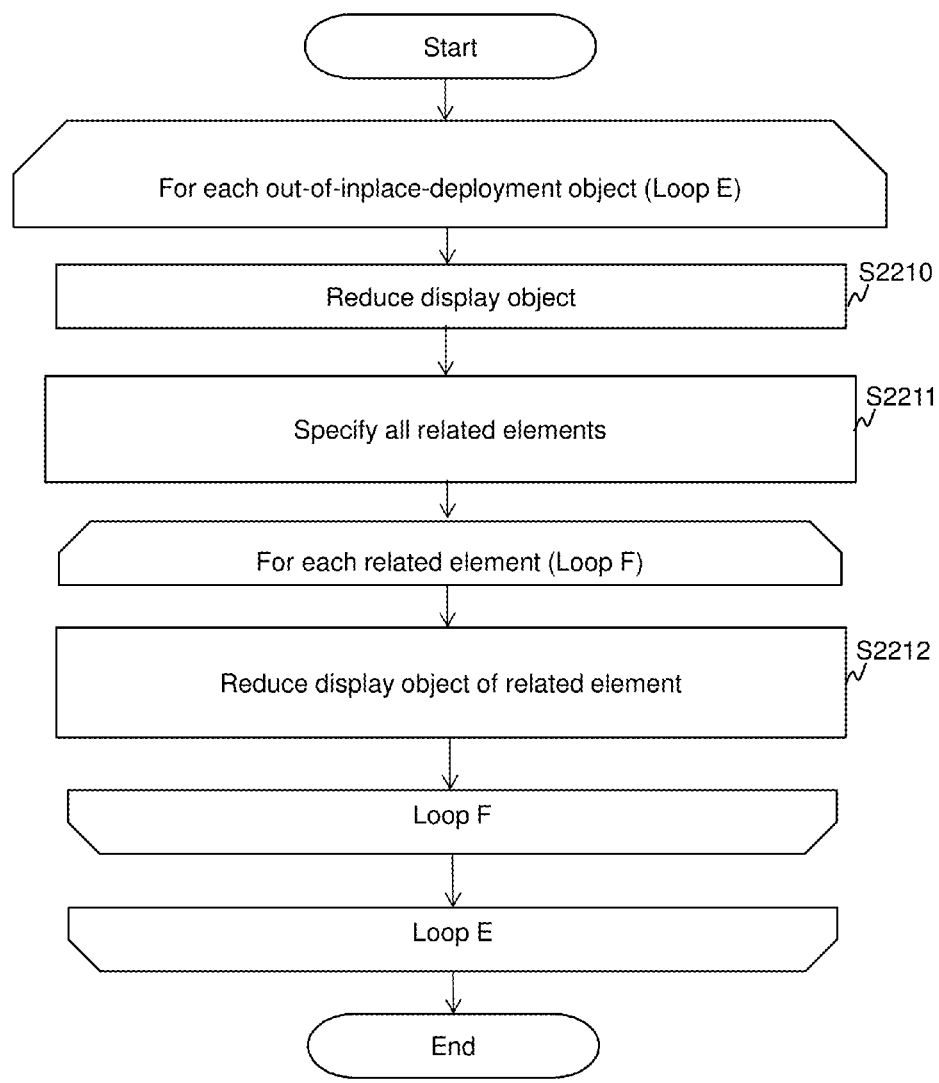
FIG. 22B illustrates an example of the flow of an out-of-in-place-deployment object reduction process.

FIG. 22A illustrates an example of the flow of an in-place deployment process. This process is performed, for example, when the management server program 541 detects a deployment operation (for example, double-click) being input at the center of a key object on the GUI screen of the HRV format display illustrated in FIG. 3. In the description of FIGS. 22A and 22B, a key element subjected to the in-place deployment is referred to as a "target key element".

The management server program 541 receives an in-place deployment request from the management client 555 (S2201). This request includes the ID of the target key element, for example. The management server program 541 performs a process of reducing an out-of-in-place-deployment object (S2202). In this step, the management server program 541 may determine the height and the position (the coordinates of four corners after the in-place deployment (enlarged-scale display)) of the display area of the in-place deployment.

The management server program 541 specifies all relation elements corresponding to the target key element from the element relation table 1710 (S2203) and performs S2204 and S2205 with respect to each of the relation elements specified in S2203. Hereinafter, one relation element (referred to as a "target relation element" in the description of FIG. 22A) is adopted as an example.

The management server program 541 specifies an element type and an element name of the target relation element from the element list table 1700 (S2204). The management server program 541 registers the element name of the target relation element to the display target list corresponding to the element type specified in S2204 among a plurality of display target lists (not illustrated) corresponding to each of a plurality of element types (S2205).

The management server program 541 performs S2206 with respect to each non-key type. That is, the management server program 541 draws a display object including respective element names registered in the display target list corresponding to the non-key type in a column (a display object enlarged in the vertical direction) corresponding to the non-key type (S2206).

The management server program 541 draws the element name of the target key element in a column (a display object enlarged in the vertical direction of the target key element) in a column corresponding to the key type (S2207).

The management server program 541 sends a response to the management client 555, indicating that a flag indicating the completion of in-place deployment on the target key element is set to ON (S2208).

FIG. 22B illustrates an example of the flow of an out-of-in-place-deployment object reduction process.

The management server program 541 performs S2210 to S2212 with respect to each of key objects (hereinafter referred to as out-of-in-place-deployment key objects) other than a target key object. Hereinafter, one out-of-in-place-deployment key object (referred to as a "target object" in FIG. 22B) is adopted as an example.

The management server program 541 reduces (decreases the height of) the target object (S2210). The management server program 541 specifies all relation elements of an element of the target object from the element relation table 1710 (S2211) and displays the display object of each of the specified relation elements at a reduced scale so that the display object has the same height as the target object after the reduction in S2210 (S2212).

Figure 23:
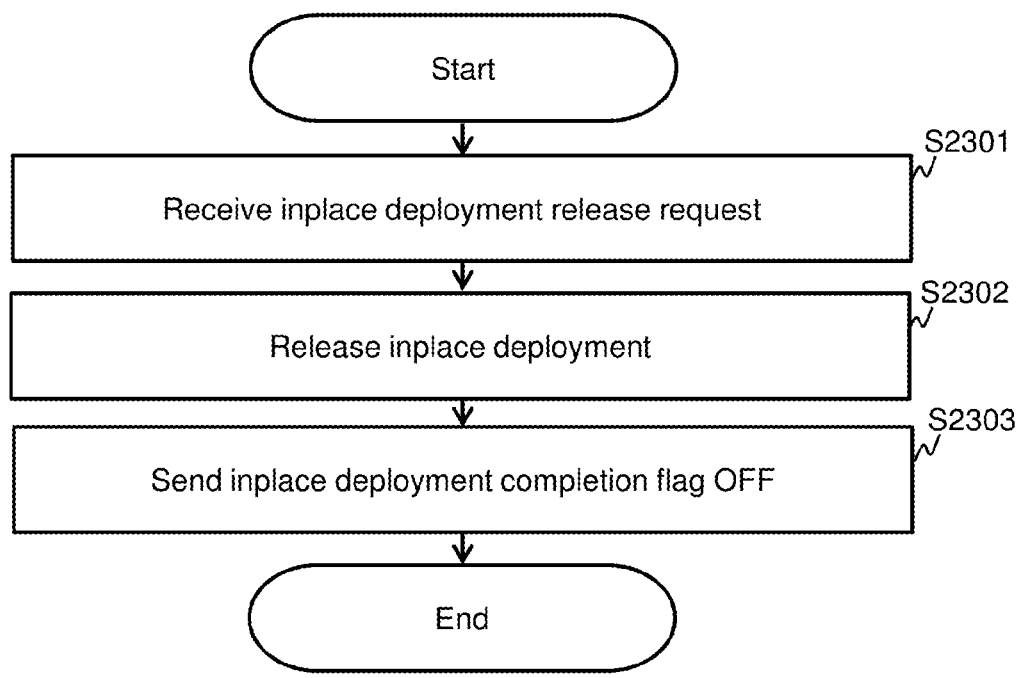
FIG. 23 illustrates an example of the flow of an in-place deployment release process.

FIG. 23 illustrates an example of the flow of an in-place deployment release process. This process is performed when the management server program 541 detects a release operation (for example, double-click) being input on a row to which in-place deployment is applied. In the description of FIG. 23, a key element subjected to the in-place deployment release process is referred to as a "target key element".

The management server program 541 receives an in-place deployment release request from the management client 555 (S2301). This request includes the ID of the target key element, for example. The management server program 541 performs an in-place deployment release process (for example, the HRV format display process in FIG. 20) with respect to a row including the display object of the target key element (S2302). The management server program 541 sends a response to the management client 555, indicating that a flag indicating the completion of in-place deployment on the target key element is set to OFF (S2303).

Figure 24:
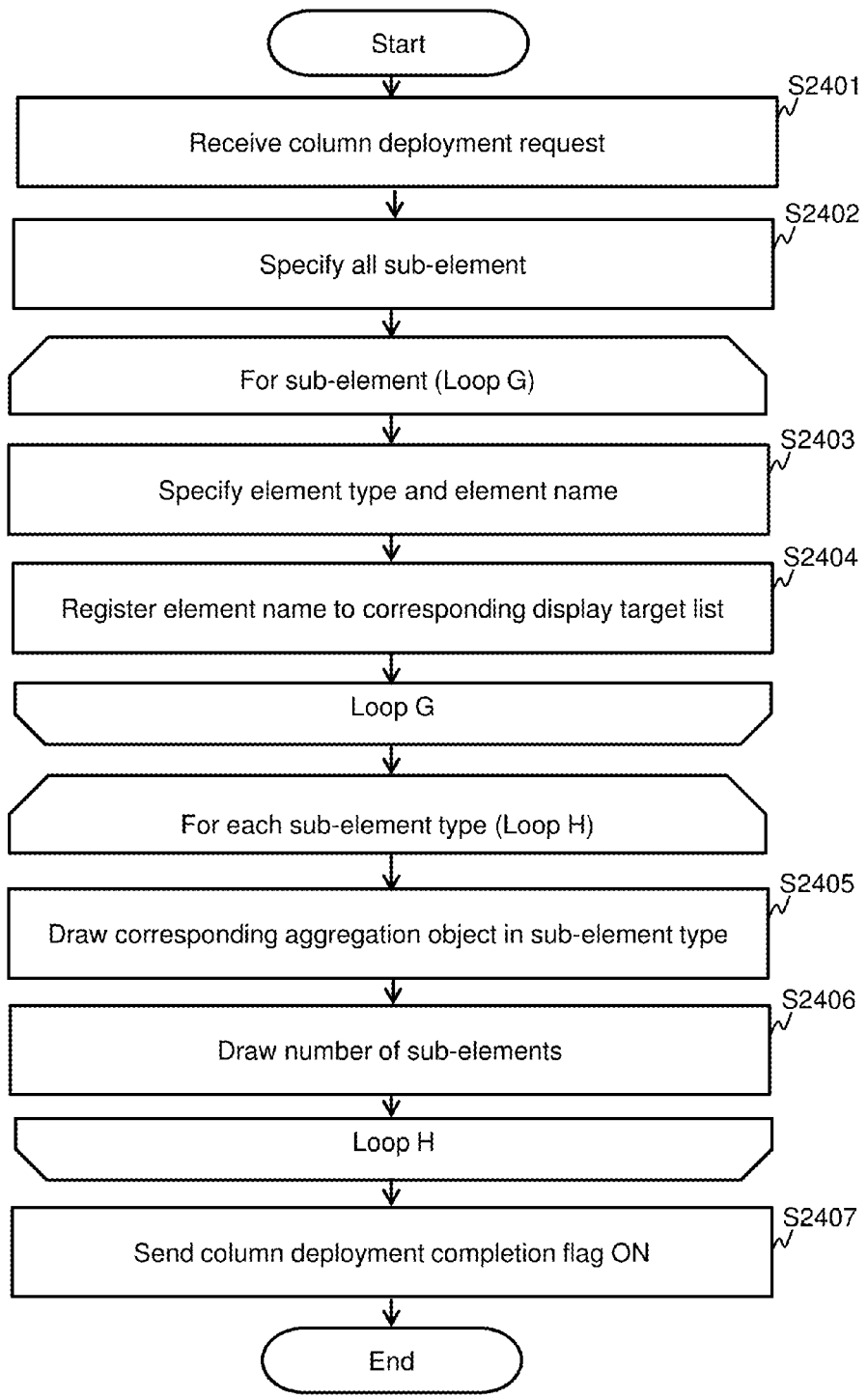
FIG. 24 illustrates an example of the flow of a column deployment process.

FIG. 24 illustrates an example of the flow of a column deployment process. This process is performed, for example, when the management server program 541 detects a deployment operation (for example, double-click) being input at the end of a key object on the GUI screen of the HRV format display in FIG. 3. In the description of FIG. 24, a key element subjected to the column deployment process is referred to as a "target key element".

The management server program 541 receives a column deployment request from the management client 555 (S2401). The management server program 541 specifies all sub-elements of each of column deployment elements (elements belonging to a row subjected to column deployment, designated by the target key element) based on the element relation table 1710 and the element type relation table 1800 (S2402) and performs S2403 and S2404 with respect to each of the sub-elements specified in S2402. Hereinafter, one sub-element (referred to as a "target sub-element" in the description of FIG. 24) is adopted as an example.

The management server program 541 specifies an element type (sub-element type) and an element name (sub-element name) of the target sub-element from the element list table 1700 (S2403). The management server program 541 registers the element name of the target sub-element to a display target list corresponding to the sub-element type specified in S2403 among a plurality of display target lists (not illustrated) corresponding to each of a plurality of sub-element types (S2404).

The management server program 541 performs S2405 and S2506 with respect to each sub-element type. Hereinafter, one sub-element type (referred to as a "target sub-element type" in the description of FIG. 24) is adopted as an example.

The management server program 541 draws an aggregation object (column) of the target sub-element type in a display object belonging to a parent element type (an element type on the higher layer than the target sub-element type) (S2405) and draws the number of sub-elements specified from a display target list corresponding to the target sub-element type in the aggregation object (S2406).

The management server program 541 sends a response to the management client 555, indicating that a flag indicating the completion of column deployment on the target key element is set to ON (S2407).

With the above-described processes, the display illustrated in FIG. 7 is realized. When objects are displayed in the VEL format illustrated in FIG. 8, Loops C and D in FIGS. 22A and 22B and S2207 may be processed as a substitute for the process of Loops G and H. In this case, "relation element" in Loop C may be replaced with the specified element in S2402, and "each non-key type" in Loop D may be replaced with "each sub-element type". When objects are displayed in the HRV format illustrated in FIG. 10, the same replacement may be performed in FIGS. 20 and 21 after the sub-element is specified in S2402.

Figure 25:
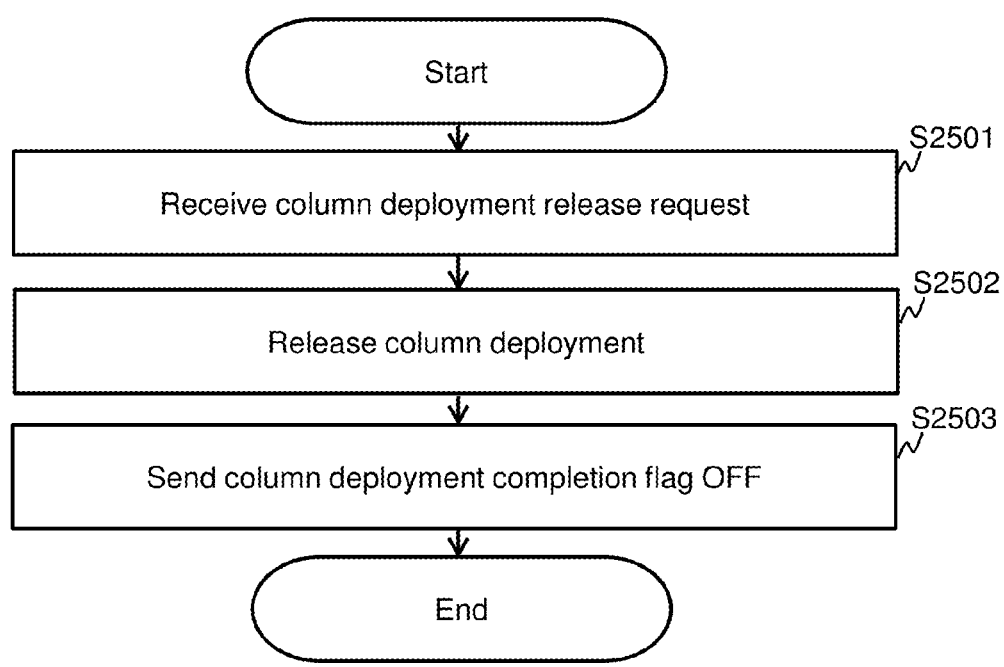
FIG. 25 illustrates an example of the flow of a column deployment release process.

FIG. 25 illustrates an example of the flow of a column deployment release process. This process is performed, for example, when the management server program 541 detects a release operation (for example, double-click) being input on a row to which column deployment is applied. In the description of FIG. 25, a key element subjected to the column deployment release process is referred to as a "target key element".

The management server program 541 receives a column deployment release request from the management client 555 (S2501). This request includes the ID of the target key element, for example. The management server program 541 puts the display object of the sub-element type in the row subjected to the column deployment into a non-display state (S2502) and adjusts the height of each of the key object and the aggregation object in the row to an original height. The management server program 541 sends a response to the management client 555, indicating that a flat indicating the completion of column deployment on the target key element is set to OFF (S2503).

Figure 26:
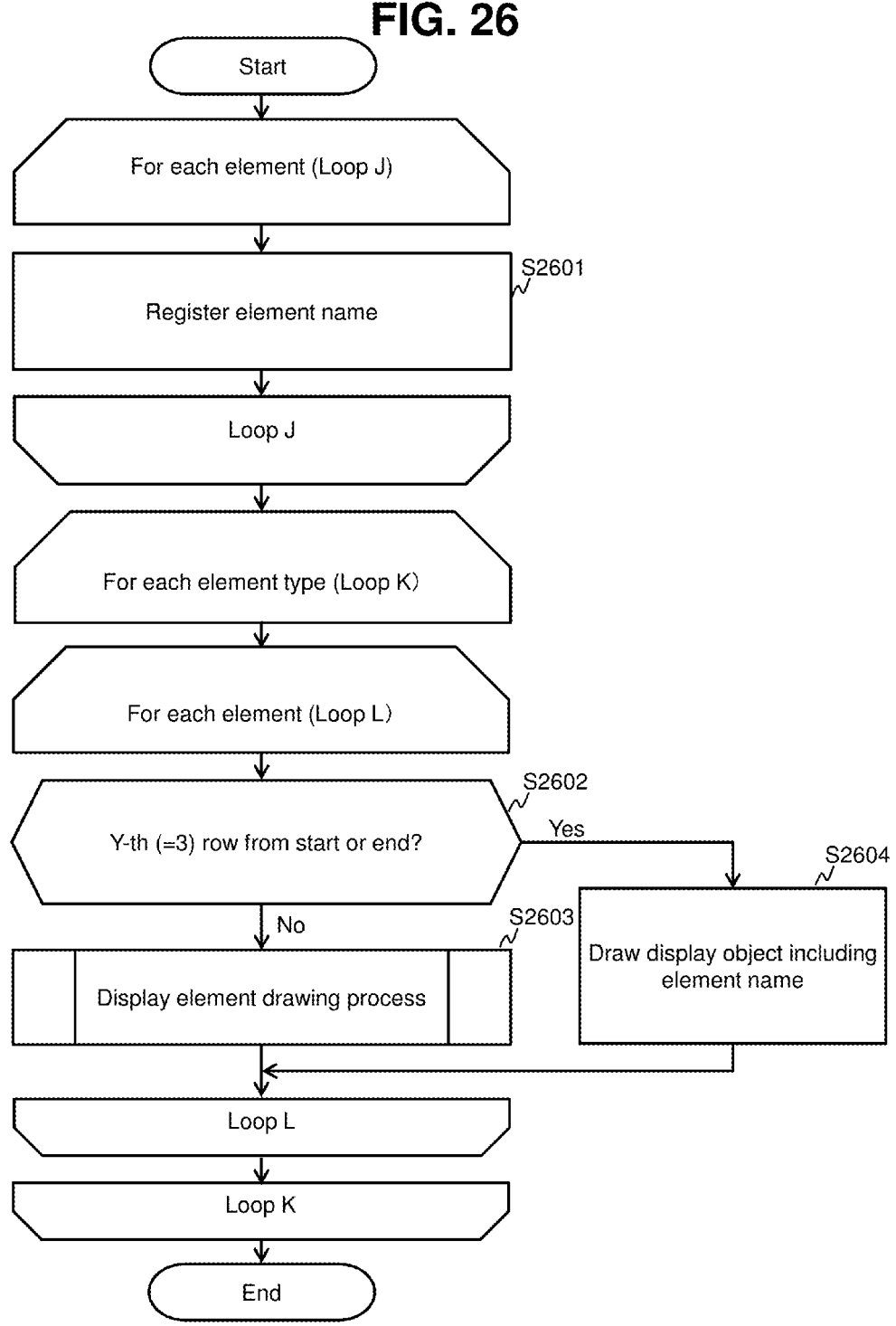
FIG. 26 illustrates an example of the flow of a VEL format display process.

FIG. 26 illustrates an example of the flow of a VEL format display process. This process is performed, for example, when the management server program 541 detects a deployment operation (for example, double-click) being input on a certain intra-column object in the GUI screen.

The management server program 541 distributes element names registered to the element list table 1700 to a display target list (not illustrated) for each element type (S2601). The management server program 541 performs S2602 to S2604 for each of element names registered to the display target lists. Hereinafter, one element (referred to as a "target element" in the description of FIGS. 26 and 27) is adopted as an example. Registering an element name to a display target list means that intra-column objects are sorted in a display order. The display order may be fixed (for example, the order is determined according to the rule based on an element name) and may be variable (for example, the order is determined according to a metric value of an element).

When the display order is fixed, the user can determine the degree of severity of a problem, meant by an emphasis display, by an approximate display position of the emphasized object (that is, the user can feel a sense of comfort when an object is not emphasized). For example, when the user remembers through experience that "a row at the center of a VEL format display is an element related to an important task," the user can feel a sense of comfort if the central portion is not emphasized. However, if columns are sorted based on variable information (for example, at least one of a variable metric value and a variable state), since it is not possible to determine the degree of severity by the position, it is preferable to sort objects in a column based on information other than the variable information.

In contrast, when objects are sorted based on variable information (for example, a variable metric value) and elements which require countermeasures are collected to an upper portion of the display, the user can easily understand elements which require countermeasures by looking at the upper portion of the display.

The management server program 541 determines whether the target element is within the Y-th element (for example, Y=3) from the start or the end (S2602). When a positive determination result is obtained in S2602 (S2602: Yes), the management server program 541 draws a display object including the element name of the target element (S2604). On the other hand, when a negative determination result is obtained in S2602 (S2602: No), the management server program 541 performs a display object drawing process on the target element (S2603).

Figure 27:
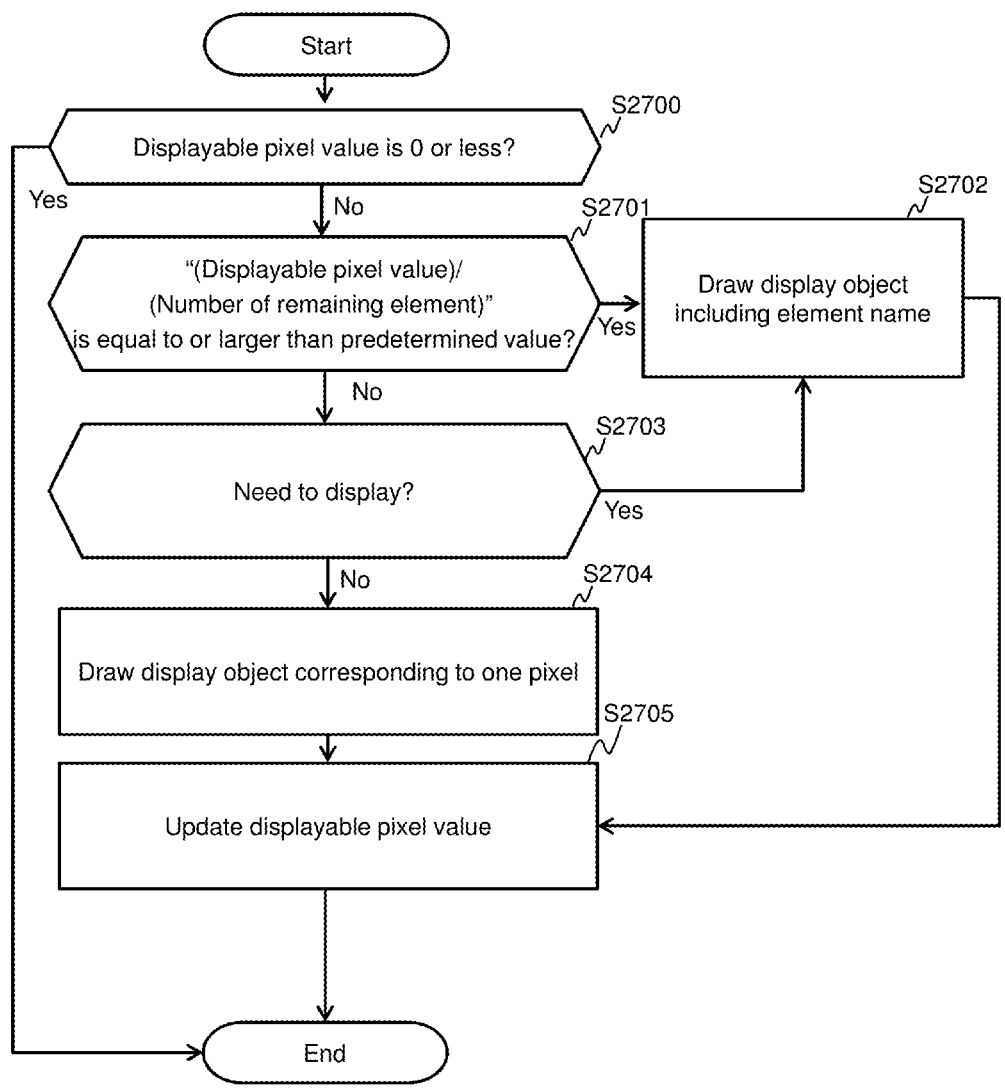
FIG. 27 illustrates an example of the flow of a display object drawing process.

FIG. 27 illustrates an example of the flow of a display object drawing process.

The management server program 541 determines whether a displayable pixel value is 0 or less with respect to an element type to which the target element belongs (S2700). When a positive determination result is obtained in S2700 (S2700: Yes), display of the object of the target element is skipped.

The management server program 541 calculates a value obtained by dividing "displayable pixel value" by "number of remaining elements" (the number of elements of an element type corresponding to the target element, on which the process of FIG. 27 has not been performed) with respect to the element type to which the target element belongs and determines whether the calculated value is equal to or larger than a pixel value necessary for displaying the element name (S2701).

When a positive determination result is obtained in S2701 (S2701: Yes), the management server program 541 draws a display object including the element name of the target element in the column of the element type (S2702).

When a negative determination result is obtained in S2701 (S2701: No), the management server program 541 determines whether the target element is an element of which the element name needs to be displayed (S2703). This corresponds to Display Rule 2 described above.

When a positive determination result is obtained in S2703 (S2703: Yes), S2702 is performed.

When a negative determination result is obtained in S2703 (S2703: No), the management server program 541 draws the display object of the target element while reducing the size (height) to one pixel (S2704).

After S2702 or S2704 is performed, the management server program 541 subtracts a pixel value corresponding to the height of a displayed display object from the displayable pixel value (S2705).

Figure 28:
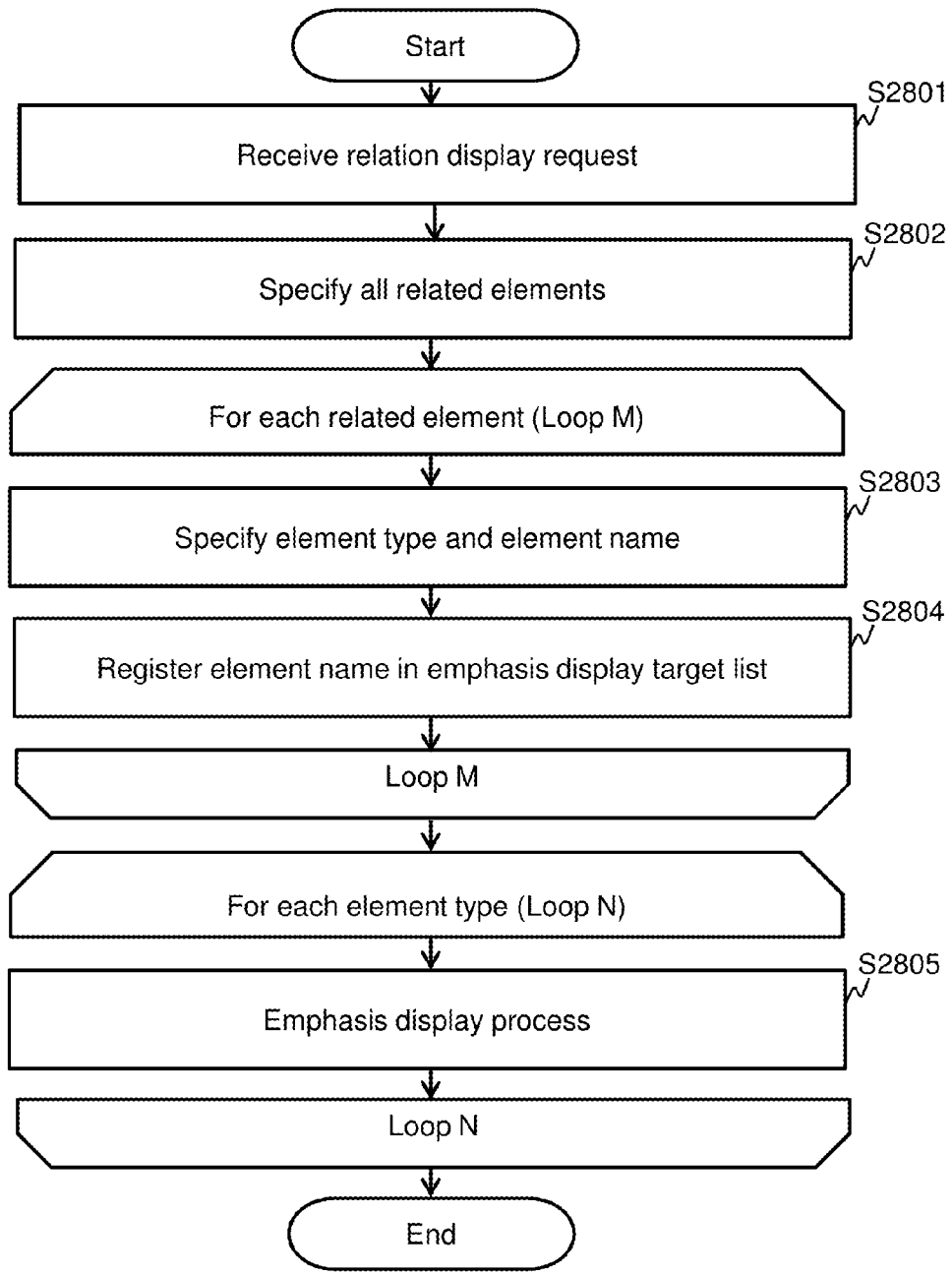
FIG. 28 illustrates an example of the flow of a relation display process in a VEL format.

FIG. 28 illustrates an example of the flow of a relation display process in the VEL format.

The management server program 541 receives a relation display request from the management client 555 (S2801). The relation display request includes the ID of an element corresponding to an object pointed (for example, clicked) by the user, for example. In the description of FIG. 28, the element is referred to as a "target element".

The management server program 541 specifies all relation elements corresponding to the target element from the element relation table 1710 (S2802), and performs S2803 and S2804 with respect to each of the relation elements specified in S2802. Hereinafter, one relation element (referred to as a "target relation element" in the description of FIG. 28) is adopted as an example.

The management server program 541 specifies an element type and an element name of the target relation element from the element list table 1700 (S2803). The management server program 541 registers the element name of the target relation element to an emphasis display target list corresponding to the element type specified in S2803 among a plurality of emphasis display target lists (not illustrated) corresponding to each of a plurality of element types (S2804).

The management server program 541 performs an emphasis display process (for example, changing of the background color) on the display object including the element name registered in each of the emphasis display target lists (S2805).

<Variations of Embodiment>

The embodiment described above may be embodied in the following variations.

The designation of the key type may be received from other modules of the management program rather than receiving the same according to a user operation and a default value may be set regardless of the user operation. A display target type other than the key type may be set in advance and may be designated according to a user operation, and a default value may be set regardless of the user operation. Top-level types may be defined so that at least all of a plurality of top-level types (in the embodiment, "Tags," "LAN," "Server Clusters," "SAN," and "Storages") are displayed in one screen.

The management server program 541 may omit the display of some elements. For example, an element which belongs to the key type of the HRV format and of which the display is omitted may be present. Moreover, an element which is a non-key type of the HRV format and which is not aggregated may be present. Further, an element of which the display is omitted when elements are displayed for each type of the VEL format may be present.

Moreover, in a multi-column format display, some columns may be displayed in a display format other than the HRV format and the VEL format.

In the in-place deployment row, a display format other than the HRV format and the VEL format (for example, a multi-column format in which the end-to-end relation between elements is drawn by lines as disclosed in PTL 1) may be employed.

The management server program 541 may perform the in-place deployment recursively a number of times equal to or larger than the above-described number of times. For example, the management system may perform first in-place deployment (where an internal display format is the HRV format) with respect to a first row of the HRV format and may perform second in-place deployment (where internal display format is the multi-column format) with respect to a second row among them. From a different viewpoint, it is considered that the in-place deployment in which the internal display format is the HRV format has a role of narrowing elements to be displayed at a preliminary step of displaying the VEL format or the multi-column format as disclosed in PTL 1 or the like, which enables the relation to be understood when there are a reasonable number of elements.

The management server program 541 may perform the column deployment recursively.

When a certain type has many sub-types (sub-columns) such as "Storages," the management server program 541 may increase the horizontal width of a column that includes the sub-column and decrease the horizontal width of the other columns on the same row as the column. In this case, the same visual effect as the in-place deployment maybe obtained by adjusting the area of the column after enlargement to overlap the area of the column before enlargement.

While an embodiment and several variations have been described, these embodiment and examples are merely examples for illustrating the present invention and the scope of the present invention is not limited to the embodiment and variations. The present invention can be also embodied in various other forms.

REFERENCE SIGNS LIST

100 Information system
555 Management client
557 Management server

The invention claimed is:

1. A non-transitory computer readable medium storing a management program causing at least one computer, coupled to an information system including a plurality of elements of a plurality of types, to execute acts comprising:
 (I) detecting the plurality of elements by collecting configuration information from the information system including the plurality of elements of the plurality of types;
 (II) selecting a plurality of display target types from among the plurality of types;
 (III) receiving a designation of one of the display target types serving as a key type for aggregated display from among the display target types; and
 (IV) displaying information on the plurality of elements according to a horizontal relation view (HRV) format which is a multi-column display format having a plurality of display target columns corresponding to the respective display target types,
 wherein (IV) displaying the information according to the HRV format includes:
 (A1) selecting a plurality of key elements belonging to the key type;
 (A2) displaying a plurality of key objects each being an object indicating information of the plurality of key elements selected in (A1), in a key column corresponding to the key type; and
 (A3) for each key object and the display target type other than the key type:
  (A3a) calculating aggregation information of a non-key element which belongs to the display target type and is related to the key element selected in (A1); and
  (A3b) displaying an aggregation object which is an object indicating the aggregation information calculated in (A3a), so that at least a portion of the aggregation object is included in an area in which the display target column corresponding to the display target type crosses an area in which the key object displayed in (A2) is extended in a horizontal direction;
 wherein the key column of key objects and multiple display target columns of aggregation objects are displayed; and
 wherein in each display target column, for any given row, one or more non-key elements corresponding to the aggregation object in the given row are related to the key element represented by the key object on the same given row as the aggregation object.

2. The computer readable medium according to claim 1, the acts further comprising:
 (B1) detecting a height enlargement request that designates a predetermined key element from among the key elements selected in (A1); and
 (B2) in order to secure an enlarged area including at least an area in which a predetermined key object representing the information on the predetermined key element is extended in the horizontal direction:
  (B2a) moving one or more of the key objects other than the predetermined key object to outside of the enlarged area;
  (B2b) moving the aggregation objects displayed in relation to the one or more of the key objects moved in (B2a) to the outside of the enlarged area;
 (B3) selecting the non-key elements related to the predetermined key element; and
 (B4) displaying the information on the predetermined key element and information on the non-key elements selected in (B3) according to a vertical element list view (VEL) format in the enlarged area.

3. The computer readable medium according to claim 2, wherein (B4) displaying the information according to the VEL format display in the enlarged area includes:
 (C1) displaying predetermined key object representing the information on the predetermined key element in the key column corresponding to the key type; and
 (C2) for each of the display target types other than the key type,
  (C2a) selecting the non-key elements belonging to the respective display target type from the non-key elements related to the predetermined key element; and
  (C2b) displaying respective non-key objects representing the information on the non-key elements selected in (C2a) in the display target column corresponding to the respective display target type such that the non-key objects are arranged in a vertical direction in the display target column add in language about upper of $1^{st}$ object and lower of last object aligning in the horizontal direction with upper and the lower of the predetermined key object in the enlarged area.

4. The computer readable medium according to claim 2, wherein (B2) further includes:
 (E1) for each deployment target type:
  (E1a) selecting a sub-type of a non-key element included in the type;
  (E1b) selecting a sub-element which is included in the predetermined key element or the non-key element selected in (B3) and belongs to the sub-type selected in (E1a); and
  (E1c) displaying information on the sub-element selected in (E1b) according to the multi-column display format in an area in which the deployment target column crosses the enlargement target area.

5. The computer readable medium according to claim 3, the acts further comprising:
 (F1) selecting an element subjected to emphasis display from among the predetermined key element or the non-key elements selected in (C2b);
 (F2) selecting an element related to the element selected in (F1) from among the predetermined key element or the non-key elements selected in (C2b); and
 (F3) emphasizing an object representing information on the elements selected in (F1) and (F2).

6. The computer readable medium according to claim 3, wherein, for at least one of the HRV format and the VEL format, when the number of display objects belonging to each column is larger than an allowable number corresponding to a height of the column, performing, on at least the column, a reduced-scale display representing that part of the display objects have been reduced in a height direction.

7. The computer readable medium according to claim 6, the program causing the at least one computer to execute enlarging an object representing an element that satisfies a condition among the part of the display objects subjected to the reduced-scale display, without changing a height of a range of the reduced-scale display and a height of at least one column among heights of columns including the reduced-scale display.

8. The computer readable medium according to claim 7, the program causing the at least one computer to execute enlarging, among the part of the display objects subjected to the reduced-scale display in the HRV format display, the object representing the element that satisfies the condition and also aggregation objects related to the object so that the aggregation objects have the same height as the object.

9. The computer readable medium according to claim 1, the program causing the at least one computer to execute adjusting a display position of each of the aggregation objects so that even a portion of the aggregation object does not fall within an area in which a key object which is not related to the aggregation object is extended in the horizontal direction.

10. The computer readable medium according to claim 1, the program causing the at least one computer to execute, in display the information according to the HRV format display, not drawing a relation line between the key object and the aggregation object.

11. The computer readable medium according to claim 1, wherein each row includes a key object in the key column and an aggregation object in each of the display target columns.

12. The computer readable medium according to claim 1, wherein the plurality of types of elements include any of:
(i) Storage Area Network (SAN) to which a fibre channel (FC) switch belongs as the element, (ii) Local Area Network (LAN) to which an IP switch belongs as the element, (iii) Server Clusters to which a plurality of types of server elements belong as the element, the plurality of types of server elements including any of a virtual machine (VM), a hypervisor (HV) which controls one or more virtual machines, a cluster of hypervisors which is a parent element of HV, and a data store (DS) which is recognized by the hypervisor as a storage device, (iv) Tags to which a company which uses the virtual machine belongs as the element, and (v) Storages to which a virtual storage platform (VSP) belongs as the element.

13. The computer readable medium according to claim 12, wherein the key type is Storages.

14. A management system that manages an information system including a plurality of elements of a plurality of types having key elements of a key type and non-key elements of non-key types, comprising:
a processor configured to detect the plurality of elements by collecting configuration information from the information system;
a storage resource configured to store information on the plurality of elements; and
a display device in which the plurality of detected elements are displayed, by the processor, according to a horizontal relation view (HRV) format which is a multi-column display format,
as for displaying the plurality of elements according to the HRV,
1A) each of the plurality of columns corresponding to any one of the plurality of types,
1B) the plurality of columns including a key column which is a column corresponding to the key type and serving as a key for aggregated display and multiple aggregation target columns subjected to aggregated display according to the key column,
1C) the key column including key objects which are objects representing information on key elements belonging to the corresponding key type and which are arranged vertically, and
1D) a lateral area of each of the key objects in the aggregation target columns including aggregation objects indicating aggregation information of non-key elements related to the key element represented by the key object, so that the key objects and the related aggregation objects are arranged on a same row;
wherein the key column of key objects and multiple aggregation target columns of aggregation objects are displayed; and
wherein in each aggregation target column, for any given row, one or more non-key elements corresponding to the aggregation object in the given row are related to the key element represented by the key object on the same given row as the aggregation object.

15. The management system according to claim 14, wherein
the processor is configured to detect a request for enlarging a predetermined row, and
in order to secure an enlarged area which includes the predetermined row and has a height larger than that of the predetermined row, the processor is configured to:
(2A) move the key object and the aggregation object included in a row above or below the predetermined row, to the outside of the enlarged area; and
(2B) display information on elements corresponding to the key object and the aggregation object included in the predetermined row, in the enlarged area according to the multi-column display format.

16. The management system according to claim 15, wherein
the multi-column display format to be displayed in the enlarged area is a VEL (vertical element list view) format, and
in the VEL format display, each column includes one or more objects which are arranged vertically and each of which represents information on one or more elements belonging to the corresponding type.

17. The management system according to claim 16, wherein the processor is configured to:
(6A) select an object subjected to emphasis display from objects in the enlarged area;
(6B) select elements related to an element represented by the object selected in (6A); and
(6C) emphasize the element selected in (6A) and the element selected in (6B).

18. The management system according to claim 15, wherein
(5A) an element represented by the key object included in the predetermined row includes a plurality of first sub-components,
(5B) an element represented by the aggregation object included in the predetermined row includes a plurality of second sub-components, and
(5C) a plurality of columns displayed in the enlarged area according to the multi-column display format includes a first sub-column corresponding to a sub-type of the plurality of first sub-components and a second sub-column corresponding to a sub-type of the plurality of second sub-components.

19. The management system according to claim 14, wherein each row includes a key object in the key column and an aggregation object in each of the aggregation target columns.

20. The management system according to claim 14, wherein the plurality of types of elements include any of:
(i) Storage Area Network (SAN) to which a fibre channel (FC) switch belongs as the element, (ii) Local Area Network (LAN) to which an IP switch belongs as the element, (iii) Server Clusters to which a plurality of types of server elements belong as the element, the plurality of types of server elements including any of a virtual machine (VM), a hypervisor (HV) which controls one or more virtual machines, a cluster of hypervisors which is a parent element of HV, and a data store (DS) which is recognized by the hypervisor as a storage device, (iv) Tags to which a company which uses the virtual machine belongs as the element, and (v) Storages to which a virtual storage platform (VSP) belongs as the element.

* * * * *